United States Patent [19]

Scheps

[11] Patent Number: 5,408,481
[45] Date of Patent: Apr. 18, 1995

[54] INTRACAVITY SUM FREQUENCY GENERATION USING A TUNABLE LASER CONTAINING AN ACTIVE MIRROR

[75] Inventor: Richard Scheps, Del Mar, Calif.

[73] Assignee: The United States of America as represented by the Secretary of the Navy, Washington

[21] Appl. No.: 183,212

[22] Filed: Jan. 14, 1994

Related U.S. Application Data

[63] Continuation-in-part of Ser. No. 970,328, Oct. 26, 1992, Pat. No. 5,276,695, and a continuation-in-part of Ser. No. 108,131, Aug. 12, 1993, Pat. No. 5,333,142.

[51] Int. Cl.$^6$ ............................................. H01S 3/109
[52] U.S. Cl. ..................................... 372/22; 359/326; 372/20; 372/23
[58] Field of Search ................................. 372/20–23; 359/326, 328, 329

[56] References Cited

U.S. PATENT DOCUMENTS

| | | | |
|---|---|---|---|
| 3,731,110 | 5/1973 | Dewey, Jr. ................ | 372/21 X |
| 4,791,631 | 12/1988 | Baumert et al. ............ | 372/22 |
| 4,809,291 | 2/1989 | Byer et al. ................ | 372/75 |
| 5,038,352 | 8/1991 | Lenth et al. ............... | 372/21 |
| 5,081,630 | 1/1992 | Lowenthal et al. .......... | 372/20 |
| 5,088,105 | 2/1992 | Scifres et al. ............. | 372/92 |
| 5,121,398 | 6/1992 | Rao ........................ | 372/20 |
| 5,121,404 | 6/1992 | Aoshima et al. ............ | 372/75 |
| 5,260,953 | 11/1993 | Rowe ....................... | 372/20 |
| 5,276,695 | 1/1994 | Scheps ..................... | 372/20 |
| 5,333,142 | 7/1994 | Scheps ..................... | 372/22 |

Primary Examiner—John D. Lee
Attorney, Agent, or Firm—Harvey Fendelman; Thomas Glenn Keough

[57] ABSTRACT

A means for intracavity sum frequency generation is described in which a laser operates simultaneously, cw, at two wavelengths where the net gain at one wavelength is substantially lower than that at the other. The optical alignment of the resonator provides a region where both fundamental wavelengths are overlapped, and another region where both feedback paths are spatially distinct. An active feedback mirror is located in the path of the lower net gain laser transition to provide optical amplification at that wavelength. The laser resonator further contains a sum frequency generating crystal for intracavity sum frequency generation of the two fundamental wavelengths. The sum frequency generating crystal is placed near a laser resonator cavity mode waist in the region where both wavelengths are spatially superimposed, producing the sum frequency of the two wavelengths. An intracavity polarization rotator provides the appropriate orientation of the polarization of the two fundamental wavelengths in the laser gain element as well as in the non-linear sum frequency generating crystal. Line narrowing of the individual two fundamental wavelengths produces a line narrowed sum frequency generated output. Sum frequency generation at 459 nm is demonstrated in a non-critically phase matched Type II KTP crystal by operating a Ti:sapphire laser simultaneously at 808 nm and 1.064 $\mu$.

44 Claims, 7 Drawing Sheets

INTRACAVITY SUM FREQUENCY GENERATION USING A TUNABLE LASER CONTAINING AN ACTIVE MIRROR

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This is a continuation in part of U.S. patent application Ser. No. 07/970,328, filed Oct. 26, 1992, issued as U.S. Pat. No. 5,276,695, by Richard Scheps entitled "A Multifrequency, Rapidly Sequenced or Simultaneously Tunable Laser" and U.S. patent application Ser. No. 08/108,131, filed Aug. 12, 1993, issued as U.S. Pat. No. 5,333,142, by Richard Scheps entitled "A Technique For Intracavity Sum Frequency Generation".

BACKGROUND OF THE INVENTION

The present invention relates to lasers and non-linear frequency conversion techniques and, particularly, to a technique to convert infrared radiation to visible radiation using intracavity sum frequency generation.

Solid state lasers are a class of lasers which contain a solid state gain element. The gain element generally consists of a host material, which can be either a crystalline or amorphous or glass-like material, and a dopant or impurity ion distributed within the host material. The dopant ion, which is typically a transition element or rare earth element, is the primary determinant of the wavelength or wavelengths over which the laser can emit radiation. Typically, solid state lasers operate in the infrared region between 700 nm and 3 $\mu$.

However, it is desirable for numerous applications to use a visible laser. Because of the convenience of the solid state laser gain medium compared to either gaseous or liquid gain media, techniques have evolved to convert the infrared fundamental radiation to visible radiation. Non-linear optical conversion commonly is used to produce visible radiation from solid state lasers operating in the infrared (IR). Wavelengths in the blue are of particular interest for applications such as display technology, optical data storage, and underwater applications. The most common non-linear optical conversion technique is a process called second harmonic generation, or doubling. To achieve doubling the laser output is directed through a non-linear optical material. The laser beam emerging from the non-linear crystal is at one-half the wavelength of the initial laser beam. The initial laser wavelength is referred to as the "fundamental wavelength" and the doubled wavelength often is called the "second harmonic".

An important parameter for a non-linear crystal is the phase matching condition. Optimum conversion from the fundamental wavelength to the second harmonic wavelength will occur when the wave vector mismatch between the fundamental wave and the generated wave is zero. This condition is termed "phase matching". Phase matching may be achieved in an anisotropic crystal by a suitable choice of direction of propagation and polarization relative to the crystalline axes.

Two different types of second harmonic generation can occur in non-linear crystals. The second harmonic process can be thought of as mixing two waves of identical wavelength to produce a third wave at one-half the wavelength. In this context, Type I second harmonic generation refers to the process where the two fundamental waves have the same polarization. Type II second harmonic generation occurs when the fundamental waves have orthogonal polarizations.

Phase matching is achieved as a result of the dispersion of the non-linear crystalline host. Dispersion refers to the dependence of the refractive index of a given material on wavelength. Phase matching is achieved in second harmonic generation when the refractive index at the fundamental wavelength is equal to the refractive index at the second harmonic wavelength. Because of dispersion, the refractive indices at the two wavelengths can be equal if the material is birefringent. That is, the crystal must have a different refractive index for the ordinary and extraordinary waves. In this case a propagation direction may be chosen with respect to the crystallographic axes where for a given fundamental wavelength, the refractive indices for the second harmonic and fundamental wavelengths are identical.

The conditions for phase matching depend specifically on the desired non-linear operation. For example, second harmonic generation of the Nd:YAG laser wavelength from 1.064 $\mu$ to 532 nm requires that the refractive index of the non-linear crystal at 1.064 $\mu$ and the refractive index at 532 nm be identical. In such a case the phase relationship between the fundamental wavelength and the generated second harmonic wavelength remain unchanged as the two waves propagate along the length of the crystal.

When phase matched second harmonic generation is achieved by propagating the fundamental wavelength along a direction different from a principal axis of a birefringent crystal it is termed "critical phase matching." When critical phase matched second harmonic generation is used with a focused beam, there is a phase mismatch of the wave vector for small deviations from the phase match direction due to the finite divergence of the beam. However, since the efficiency of the non-linear conversion process is a function of the power density within the non-linear crystal, focusing is generally desirable to achieve high conversion efficiency.

When the phase matching angle is 90 degrees for a particular non-linear process in a given material, it is termed "noncritical phase matching" (NCPM). In such a case, effects of beam divergence vanish. That is to say, a strongly focused beam in an NCPM crystal does not have the phase mismatch problems as is evident in critical phase matching. In addition the walk-off angle, which is the direction of energy flow of the fundamental and second harmonic beams, is zero. This allows the two beams (the fundamental and second harmonic) to propagate collinearly within the crystal.

NCPM is therefore a desirable and potentially highly efficient type of phase matching. One means by which NCPM can be obtained is by adjusting the temperature of the non-linear crystal to the point where the refractive index of the fundamental wavelength equals that of the second harmonic wavelength for a particular angle of propagation with respect to the crystallographic axes. NCPM can also be achieved at room temperature for a given non-linear material and fundamental wavelength. Room temperature NCPM has the advantage of simplicity.

Second harmonic generation is a special case of a more general non-linear optical conversion process known as sum frequency generation (SFG). In second harmonic generation, two optical waves of the same wavelength are combined to produce a single wave of a wavelength one-half the original fundamental wavelength. In sum frequency generation two fundamental waves of different wavelengths are combined to produce a third wavelength. The wavelength produced by sum frequency generation is determined by the following equation:

$$\frac{1}{\lambda_1} + \frac{1}{\lambda_2} = \frac{1}{\lambda_3} \qquad (1)$$

where $\lambda_1$ represents one of the fundamental wavelengths, $\lambda_2$ represents the second fundamental wavelength, and $\lambda_3$ represents the converted or summed wavelength. Second harmonic generation is a degenerate case of sum frequency generation, since $\lambda_1 = \lambda_2$. The fundamental principles of non-linear optics summarized briefly above are well known and are discussed in detail in the literature. See, for example, G. D. Boyd and D. A. Kleinman, *Journal of Applied Physics*, vol. 39, p. 3597, 1968.

Although doubling can be an efficient means for obtaining blue visible wavelengths, the non-linear optical material KTiOPO$_4$ (KTP) is non-critically phase matched at room temperature for sum frequency generation at 808 nm and 1.064 $\mu$, see, for example, K. Kato, *IEEE J. Quantum Electronics*, vol. QE-24, p. 3, 1988. The generated wavelength is 459 nm. This blue wavelength is of particular interest for several applications because it is compatible with the Cs atomic resonance filter. The Cs filter has the properties of having an extremely narrow bandwidth (about 0.002 nm) and a very wide acceptance angle. Optical radiation only within the pass-band of 459 nm±0.002 nm is transmitted through this filter, so that the solar background is largely eliminated. An optical detector used in conjunction with this filter will detect virtually no natural solar light.

As a consequence, the detector will be highly sensitive to 459 nm radiation from a transmitter even in the presence of full sunlight. Put another way, the noise rejection for such a detector is extremely high. The 459 nm wavelength is therefore desirable for optical transmission of a weak signal in the presence of a large solar background when used in conjunction with a Cs atomic resonance filter. This wavelength is also near the optimum transmission wavelength for underwater propagation.

There are several compelling advantages to recommend the SFG process in KTP over direct doubling of 918 nm to 459 nm. For one, the required fundamental wavelengths (808 nm and 1.064 $\mu$) can be obtained efficiently, while 918 nm is difficult to generate efficiently. For SFG, Nd:YAG operates efficiently at 1.064 $\mu$ while several lasers, including Ti$^{3+}$:sapphire, AlGaAs laser diodes and Cr$^{3+}$-doped crystals produce efficient output at 808 nm. In addition, KTP is a robust, mature and efficient non-linear crystal which is readily available in excellent quality from a number of commercial suppliers. Crystals that are appropriate for second harmonic generation of 918 nm, such as KNbO$_3$, are less robust or mature. And finally, KTP has an exceptionally wide angular and temperature bandwidth for room temperature (approximately 25° C.) non-critical phase matched sum frequency generation; see, for example, the article by J. -C. Baumert, F. M. Schellenberg, W. Lenth, W. B. Risk and G. C. Bjorklund, *Appl. Phys. Lett.*, vol. 51, p. 2192, 1987. Second harmonic generation from 918 nm is generally not NCPM at room temperature.

Typically, sum frequency generation requires two different laser sources. Since the efficiency of the sum frequency generation process depends on the power density (power per unit area) within the optical crystal, extremely small focused spot sizes within the non-linear sum frequency generating crystal typically are used. Using two different laser sources generally leads to problems involving the alignment of the beams to the high degree of accuracy required by these small spot sizes within the non-linear crystal. In addition, when using two separate laser sources, there are inefficiencies that result from mismatching of the spatial modes of the two lasers in terms of size, shape and intensity distribution.

One technique for avoiding the use of two separate lasers for the sum frequency generation process in which 808 nm and 1.064 $\mu$ are combined to produce 459 nm blue output is to use a laser diode pumped Nd:YAG laser which uses the residual (unabsorbed) 808 nm pump radiation from the laser diode for sum frequency generation, see for example, the article by W. P. Risk, J. -C. Baumert, G. C. Bjorklund, F. M. Schellenberg and W. Lenth, *Appl. Phys. Lett.*, vol. 52, p. 85, 1988. In this type of sum frequency generation process a laser diode at 808 nm is used to pump a Nd:YAG laser which operates at 1.064 $\mu$. The residual or unabsorbed 808 nm pump light is then circulated within the Nd:YAG laser resonator cavity which also includes a sum frequency generating KTP crystal. In such a system there is only one active laser, the laser diode. Since the Nd:YAG is optically excited by the laser diode and in essence serves as a frequency conversion device to convert some of the 808 nm light to 1.064 $\mu$ light, one might conclude that sum frequency generation is achieved with the use of only one active laser. A patent by Baumert et al., U.S. Pat. No. 4,791,631, describes this concept in detail.

A variation of the Baumert et al. type of sum frequency generation process is to have an additional laser diode or laser diodes which are not used to pump the Nd:YAG directly but are used to introduce additional 808 nm light into the laser resonator which contains the Nd:YAG crystal and the KTP nonlinear crystal. In this case a separate laser diode is used to pump the Nd:YAG laser.

It should be noted that for continuous wave (cw) sum frequency generation the use of the KTP crystal within a resonator is essentially a requirement which stems from the necessity of having very high power densities to achieve efficient generation of 459 nm light. Therefore, the KTP crystal used for cw sum frequency generation usually receives focused light at 808 nm and 1.064 $\mu$ within a laser resonator cavity. Using the KTP crystal inside a laser resonator cavity is desired because the circulating optical flux within a laser resonator cavity, which is forced by highly reflective end elements to oscillate back and forth, will have a much higher power than light outside the cavity.

A second patent by Dixon et al., U.S. Pat. No. 4,879,723, describes another version of the concept patented earlier by Baumert et al. In the Dixon et al. patent a laser diode pumped Nd:YAG laser is established in a laser resonator cavity containing the KTP crystal similar to the Baumert patent. In addition, the output of a second laser diode is introduced into this same cavity to provide a separate source of 808 nm power. In the Dixon et al. patent a possibility of high modulation rate of the 459 nm light is considered.

Sum frequency generation utilizing a laser diode has a unique set of difficulties, particularly for scaling to higher power. These difficulties stem from the broad spectral bandwidth and poor beam quality that typically is associated with high power laser diodes. Laser diodes with power output on the order of 1 Watt or more are typically multi-spectral devices. This broad spectral output limits the efficiency of sum frequency generation at a specific blue-green wavelength. In addition, these high power laser diodes typically are multi-transverse mode devices, as they arise from gain-guided wide-stripe architectures. As a consequence of the large number of transverse modes, it is not possible to focus the output of the high powered 808 nm laser diode into a small enough spot to produce efficient sum frequency generation. In addition, the spatial mismatch between the focus spot of a typically astigmatic high transverse mode laser diode and the $TEM_{00}$ output of a Nd:YAG laser further prohibits good optical conversion efficiency for the sum frequency generation process.

For cw sum frequency generation in which 808 nm and 1.064 $\mu$ wavelength are summed to produce 459 nm, an additional problem arises in the types of approaches represented by the Dixon et al. and Baumert et al. patents cited above. In those approaches the laser resonator cavity in which the two fundamental wavelengths are resonated or circulated (in order to produce the high intracavity power desired for efficient sum frequency generation) also contains the Nd:YAG laser gain element. However, the Nd:YAG element absorbs strongly at 808 nm and therefore reduces the intracavity power at that wavelength. Subsequently the overall conversion efficiency is reduced.

Several variations on the general techniques proposed by the Dixon et al. and Baumert et al. patents have been published. All of these concepts suffer from the problem of having a Nd:YAG gain element which absorbs at 808 nm contained within the laser resonator cavity that is used to obtain high intracavity power at 808 nm. See, for example, the articles by D. W. Anthon and G. J. Dixon, M. G. Ressl, and T. J. Pier, *Proceedings of the SPIE*, vol. 898, p. 60, 1988; W. P. Risk and W. Lenth, *Appl. Phys. Lett.*, vol. 54, p. 789, 1989; and P. N. Kean and G. J. Dixon, *Optics Letters*, vol. 17, p. 127, 1992.

Since good efficiency dictates the use of intracavity sum frequency generation (or "mixing") to take advantage of the high circulating power at the fundamental wavelengths, absorption of the 808 nm power by a Nd:YAG gain element contained within the laser resonator cavity will counteract the enhancement of the 808 nm power within the cavity and reduce the overall conversion efficiency. One solution to the problem had been suggested in which an optically thin Nd:YAG slab is used. Thin slabs have a shorter absorption length and therefore do not absorb as strongly in a single pass as longer Nd:YAG gain elements would. See, for example, the article by P. N. Kean and N. G. Dixon, *Optics Letters*, vol. 17, p. 127, 1992. The use of the optically thin slab mitigates the problem but does not completely eliminate the intracavity absorption of 808 nm power.

A different type of solution has been proposed in which sum frequency generation occurs in an external resonant cavity. In this type of approach the output of a laser diode-pumped Nd:YAG laser is introduced into a second resonator cavity which contains only a sum frequency generating KTP crystal. The 1.064 $\mu$ power from the diode-pumped Nd:YAG laser circulates in this cavity. In addition, the output of the laser diode at 808 nm is also introduced into the external cavity. Thus, both 1.064 $\mu$ and 808 nm fundamental radiation can circulate with high power density and produce efficient 459 nm radiation. See, for example, the article by W. P. Risk and W. J. Kozlovsky, *Optics Letters*, vol. 17, p. 707, 1992. However, it is to be noted that generation in an external resonant cavity, although circumventing the absorption problem in which the Nd:YAG gain element absorbs the 808 nm circulating power, introduces the alignment and mode matching difficulties which were referred to above. This technique for generating 459 nm light is therefore subject to losses in efficiency due to imperfect spatial overlap of the two beams from two separate lasers.

The above-referred to co-pending U.S. patent application Ser. No. 08/108,131 discloses a technique in which a single laser produces the two fundamental wavelengths simultaneously. The non-linear mixing crystal is contained within the laser resonator cavity to take advantage of the high circulating power. This technique for SFG not only circumvents the alignment problems associated with using two separate lasers, but also avoids the absorption problems associated with resonating 808 nm light in the presence of a strongly absorbing Nd:YAG gain element. However, in order to operate a laser at two wavelengths simultaneously, the net gain at the two wavelengths must be comparable. In general, the spectral dependence of the stimulated emission coefficient for a laser material (which determines the intrinsic gain of the material) makes it unlikely that the gain would be the same at both fundamental wavelengths for the SFG process generating 459 nm. Note that the two fundamental wavelengths, 808 nm and 1.064 $\mu$, are separated by over 200 nm.

The above-cited co-pending U.S. Patent Application discusses an exemplary Ti:sapphire laser. This laser material has a stimulated emission cross section at 1.064 $\mu$ equal to approximately 20% of the stimulated emission cross section at 808 nm. In order to achieve simultaneous operation at 808 nm and 1.064 $\mu$ in Ti:sapphire, the net gain at 1.064 $\mu$ must be enhanced relative to that at 808 nm.

Two enhancement techniques are described in the above-cited co-pending patent application. The first uses a low power optical signal at 1.064 $\mu$ which is injected into the Ti:sapphire laser resonator cavity. A second technique was described which uses a doubled Nd:YAG laser to pump the Ti:sapphire laser material. The pump beam is a dual wavelength beam which contains both 532 nm, the doubled output of Nd:YAG, and 1.064 $\mu$, the Nd:YAG fundamental wavelength. The 1.064 $\mu$ power is the un-doubled Nd:YAG power which would otherwise be filtered out of the pump beam. Both of these techniques have proven to be viable and effective means to accomplish the task of equalizing the net gain at the two fundamental wavelengths.

However, for the injection technique, alignment of the injecting source with the Ti:sapphire laser resonator cavity is critical. In addition, the injection source must be mode-matched to the spatial mode of the Ti:sapphire laser. The technique which uses a dual wavelength pump beam must also be mode-matched at 1.064 $\mu$ to the laser resonator cavity. Two lasers are said to be mode-matched over a certain spatial extent if the waist and divergence of two beams are similar.

More significantly, a cw, doubled Nd:YAG laser is not the laser source that is typically used for pumping the Ti:sapphire gain material. More commonly an argon ion laser is used, and it is desirable to develop a technique that can take advantage of the convenience of the argon ion laser pump source.

Thus in accordance with this inventive concept, a continuing need has been found in the state of the art for a technique for intracavity sum frequency generation using 808 nm and 1.064 μ to produce 459 nm output with a non-linear crystal composed of KTP which is efficient, scalable to high power, insensitive to alignment and mode matching considerations, arises from a single laser source which can be pumped by any suitable optical means, and contains no elements within the laser resonator cavity that reduce the intracavity power at 808 nm.

SUMMARY AND OBJECTS OF THE INVENTION

The present invention is directed to providing a technique for intracavity sum frequency generation in which a laser resonator is constructed capable of operating at two wavelengths simultaneously and providing a region within the resonator where both wavelengths are spatially superimposed. A non-linear sum frequency generating crystal is placed within the resonator region where the two wavelengths are superimposed, allowing the sum frequency generated wavelengths to be efficiently produced. A laser resonator is made up of two end reflective elements, three concave fold mirrors and a concave output coupler reflective element to form a reflective path and define a laser resonator cavity. A laser gain element is disposed in the reflective path in the laser resonator cavity and a means for optically exciting the laser crystal is appropriately disposed to pump the laser gain element and produce a laser emission in a preselected range of wavelengths.

An element for wavelength dispersion such as a prism is disposed in the reflective path in the laser resonator cavity between one fold mirror and the end reflective elements to provide a region of the laser resonator cavity which contains separate feedback paths for each wavelength. Two curved fold mirrors focus the laser resonator cavity mode energy within the laser gain element. One of these mirrors also serves to collimate the laser resonator cavity mode in another region of the laser resonator cavity. The laser resonator cavity mode is collimated as it passes through the prism to optimize the wavelength dispersion performance of the prism.

In order to operate simultaneously at a second wavelength for which the net gain of the laser resonator cavity is significantly lower than that at a first wavelength, an optical amplifier is placed in the resonator along the feedback path of the second wavelength. Owing to the dispersion of the intracavity prism, a section of the resonator contains spatially distinct, separate paths for the two wavelengths. The optical amplifier is placed in this section so that it does not affect operation at the first wavelength.

Typically, an end reflective element consists of a substrate, usually quartz or glass, polished on one face to be optically flat. This polished face is coated to be highly reflective (HR) at the appropriate wavelength or wavelengths and is inserted into the resonator with the coated side facing the interior of the laser resonator cavity ("front surface reflector"). This end reflective element is a passive element.

In this inventive concept, the end reflective element for the second wavelength also serves as the optical amplifier for that wavelength and is termed an "active mirror". This is achieved for 1.064 μ, the second fundamental wavelength in this inventive concept, by fabricating the mirror substrate from Nd:YAG gain material. The Nd:YAG substrate is optically pumped by a means appropriately disposed to pump the active mirror and the HR coating is placed on the rear surface of the active mirror. Resonator radiation must therefore pass through the optically active substrate prior to reflection back into the laser resonator cavity and is consequently amplified as well as reflected by a single optical element within the laser resonator cavity. Thus optical amplification at the second wavelength is provided and simultaneous operation at both wavelengths can be achieved despite the substantially different gain for these two wavelengths in Ti:sapphire.

The tunable laser can further include elements for line narrowed operation at one or more wavelengths, and shutters, apertures or the like to prevent operation temporarily at one or more wavelengths. In addition, the laser contains a polarization rotating plate capable of rotating the polarization of one wavelength operating within the laser resonator cavity 90° with respect to the other. This waveplate is appropriately located in the laser resonator cavity so that the polarization of the two fundamental wavelengths are orthogonal as they pass through the non-linear sum frequency generating crystal, but are parallel as they pass through the Ti:sapphire gain element. The orthogonal orientation of the polarization of the two wavelengths in the non-linear crystal is required for Type II SFG. The parallel orientation of the polarization of the two wavelengths in the gain element is dictated both by the higher gain cross section for the polarization E || c, where c is one of the crystallographic axes of the Ti:sapphire crystal, and by the Brewster cut end faces of the gain element.

In the region where the two fundamental wavelengths are spatially overlapped, a second laser resonator cavity focus is established by suitable placement of the concave output coupler relative to one of the concave fold mirrors. At the location of this second laser resonator cavity focus a non-linear optical crystal such as KTP is placed for the purpose of generating the sum frequency wavelength from the two fundamental wavelengths oscillating within the laser resonator cavity.

With appropriate coatings on all reflective and transmissive elements the two fundamental wavelengths are contained within the laser resonator cavity while the sum frequency generated wavelength is emitted through the output coupler of the laser resonator. Note also that the spatial intensity profile for each of the two fundamental wavelengths is close to identical, providing a natural spatial mode matching which further enhances the sum frequency generation efficiency.

By end pumping the laser crystal, a "gain aperture" is created in the laser gain element which allows the laser to operate only in the lowest order spatial transverse mode ($TEM_{00}$) at the desired wavelengths in the preselected range of wavelengths. The design of the laser resonator cavity provides spatial separation of the wavelengths operating simultaneously in one region of the laser resonator cavity and yet provides collinear superposition of the laser wavelengths in another region of the laser resonator cavity. The tuning element can be a Brewster angle dispersing prism oriented in minimum deviation.

Accordingly, an object of the invention is to provide a laser which produces two fundamental wavelengths simultaneously and contains a non-linear crystal within a laser resonator cavity which converts the intracavity flux at the two fundamental wavelengths to a third wavelength by means of sum frequency generation.

Another object of the invention is to provide a cw laser which produces fundamental wavelengths at 808 nm and 1.064 μ simultaneously, and contains a non-critically phase matched KTP crystal within the laser cavity to convert the intracavity power at the fundamental wavelengths to 459 nm cw radiation by means of intracavity sum frequency generation.

Another object of the invention is to produce efficient sum frequency generation in a dual-wavelength cw laser by creating a focus or waist in the laser resonator cavity mode and locating the non-critically phase matched, non-linear SFG crystal at the waist.

Another object of the invention is to produce efficient Type II SFG generation by providing a means for orienting the polarization of two fundamental, simultaneously produced, wavelengths to be orthogonal to one another as the fundamental radiation passes through a non-linear crystal.

Another object of the invention is to produce efficient Type II SFG generation by providing a means for orienting the polarization of two fundamental, simultaneously produced, wavelengths to be parallel to one another as the fundamental radiation passes through a gain element.

Another object of the invention is to produce stable, efficient, cw operation of a dual-wavelength laser at two wavelengths where the net gain at the first wavelength is substantially higher than that at the second wavelength by providing a means for spatially dispersing the two wavelengths in separate paths within the laser resonator cavity and inserting an optical amplifier for the second wavelength in the path of the spatially separated second wavelength.

Another object of the invention is to provide optical amplification at a second wavelength by producing an active feedback mirror that provides optical gain as the resonator mode for the second wavelength passes through the active feedback mirror substrate. The active feedback mirror has the additional function of reflecting an amplified signal at the second wavelength back into the laser resonator cavity.

Another object of the invention is to provide an active mirror at 1.064 μ by using a Nd:YAG gain material for a substrate and optically pumping this substrate to provide the required gain by using an 808 nm pump source.

Another object of the invention is to provide an additional cavity waist at an external face of an active mirror by using a concave fold mirror at a low angle of incidence.

Another object of the invention is to produce high net amplification at a second wavelength when an active mirror is optically pumped in an end-pumped configuration (i.e., the pump axis is coincident with the path of fundamental radiation through the gain substrate of the active mirror).

Another object of the invention is to provide a means for generating tunable blue visible output near 459 nm by adjusting the wavelength of one or both fundamental wavelengths near 808 nm and 1.064μ.

Another object of the invention is to provide a laser resonator cavity which operates at two fundamental wavelengths simultaneously and lases in the lowest order spatial transverse mode at both wavelengths over a preselected wavelength range.

Another object of the invention is to provide a tunable cw laser resonator which produces laser emission at two or more wavelengths simultaneously and further contains an intracavity non-linear sum frequency generating crystal to produce the sum frequency wavelength of the two fundamental wavelengths.

Another object of the invention is to provide a tunable solid state laser which operates at two or more wavelengths simultaneously in which part of the laser resonator cavity mode is collimated, allowing the use of an intracavity dispersing Brewster angle prism placed in a minimum deviation configuration to determine the wavelengths that are simultaneously achieved.

Another object of the invention is to create a region in the laser resonator cavity where the two wavelength feedback paths are spatially isolated so that one may be amplified or attenuated without affecting the intensity of the other.

Another object of the invention is to provide a line narrowed tunable solid state laser which produces simultaneous cw output at two wavelengths, the bandwidth of each frequency being substantially narrowed by the insertion of intracavity narrowing elements and which produce a line narrowed sum frequency generated wavelength.

Yet another object of the invention is to provide a tunable laser which operates at two or more wavelengths simultaneously and in which the laser resonator cavity mode contains a region where the two wavelengths are spatially overlapped or superimposed, that region further containing a non-linear crystal for sum frequency generation such that the two wavelengths produced simultaneously are spatially superimposed within the non-linear sum frequency generation crystal.

These and other objects of the invention will become more readily apparent from the ensuing specification and drawings when taken in conjunction with the appended claims.

DETAILED DESCRIPTION OF THE PREFERRED EMBODIMENTS

This inventive concept involves the implementation of an optical laser resonator cavity that will allow simultaneous cw laser oscillation at two laser wavelengths and in addition, includes a polarization rotating means and a non-linear sum frequency generating crystal to produce efficient sum frequency output. This inventive concept is a continuation in part of the above referenced patent applications in which a multifrequency, rapidly sequenced or simultaneous tunable laser is described, and techniques for intracavity sum frequency generation are discussed.

The design of the optical laser resonator cavity disclosed herein is generic and could be used either in laser systems with discretely tunable or continuously tunable gain media. In addition, the design of the optical laser resonator cavity disclosed herein could be used with crystalline or noncrystalline amorphous or glass-like gain media as well as liquid gain media such as dye lasers or chelate lasers or gaseous gain media. The sum frequency generating process disclosed herein can be either Type I or Type II and can produce sum frequency wavelengths from the ultraviolet to the infrared. Furthermore, the sum frequency generating crystal can be critically phase matched or non-critically phase matched. The fundamental wavelengths can be line narrowed to produce line narrowed sum frequency generated output. Or they may be broadband, in which case a broadband sum frequency generated output is produced. The technique described herein is appropriate for both cw and pulsed laser operation.

The optical laser resonator cavity can be resonantly pumped or flash pumped. The wavelength range over which the laser system operates is determined by the nature of the laser gain medium as well as by the reflective coatings and transmission of the optical elements contained within the laser resonator cavity.

Figure 1B:
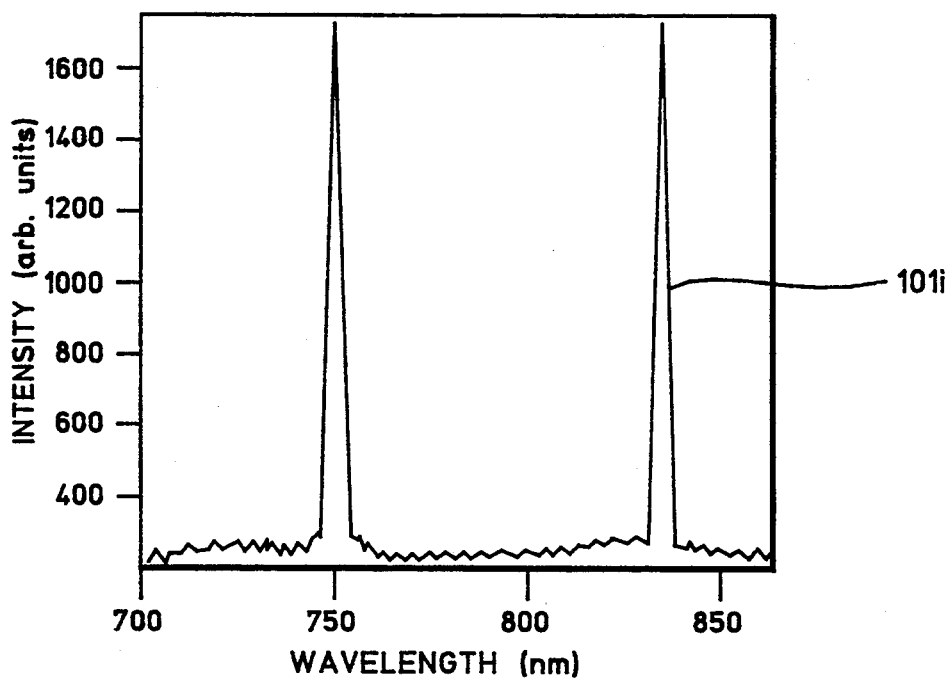
FIGS. 1A and 1B illustrate the basic design of a two-wavelength Ti:sapphire laser and a graph depicting intensity versus wavelength thereof, respectively, in accordance with the above-referenced co-pending U.S. Patent Applications.
Figure 1A:
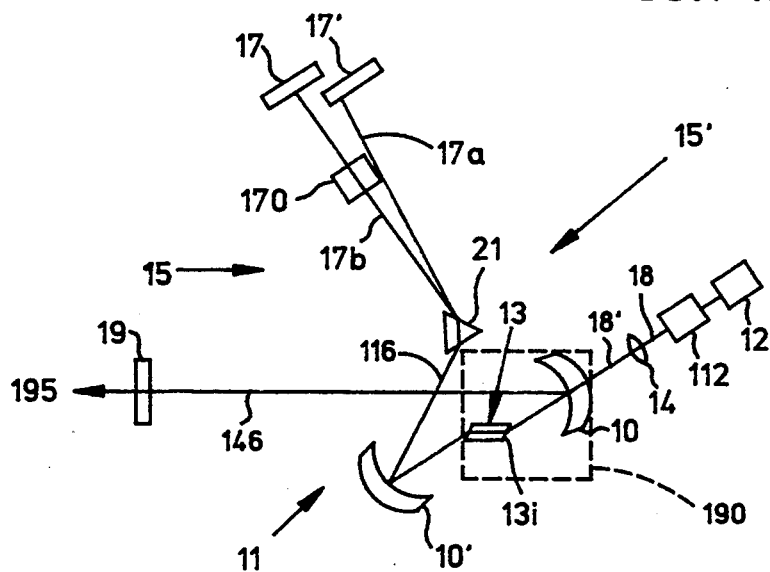

Referring now to the drawings wherein like reference numerals designate identical or corresponding parts throughout the several views, FIG. 1A illustrates a dual wavelength laser resonator used to obtain simultaneous dual-wavelength cw operation in accordance with the above-referenced co-pending Patent Applications. A tunable laser 11 includes a laser crystal 13 disposed in a laser resonator 15' defined by optically aligned end reflective elements or mirrors 17 and 17', concave fold reflective elements 10 and 10', and an output coupler reflective element mirror 19 in a reflective path in a laser resonator cavity 15. As an aid for understanding the dual wavelength laser resonator illustrated in FIG. 1A it will be described in terms of operating at two frequencies simultaneously between 700 and 850 nm. It is to be understood that other wavelength ranges can be accessed by suitable mirror coatings on all reflective elements and by the selection of an appropriate gain medium.

This laser, which is described in more detail in the above referenced co-pending patent applications, produces two wavelengths simultaneously and collinearly through output coupler 19 in a wavelength range between 700 and 850 nm. Mirrors 17 and 17' are highly reflective while the mirror 19 is partially transmissive to a laser wavelength of approximately 700 to 850 nm to provide the output coupling for the laser emission within the wavelength range from about 700 nm to 850 nm from tunable laser 11.

For ease of understanding of the invention, tunable laser 11 of FIG. 1A is described in terms of a tunable solid state laser pumped by an argon ion laser 12 and having a laser rod or crystal 13 of an exemplary $Ti^{3+}$-activated sapphire host material to produce a laser beam or emission which can be tuned within the wavelength range of about 700 nm to 1.1 $\mu$. It should, however, be remembered that a different wavelength range can be realized by utilizing different reflective coatings on optical elements 17, 17', 10, 10' and 19, or by utilizing a laser gain element 13 which contains a different amplifying medium and different associated optical elements.

The Ti:sapphire laser is an ideal replacement for cw dye lasers that operate in the 700 nm to 1.1 $\mu$ range. Its broad tunability and high stimulated emission cross-section make it a particularly appropriate choice for applications that require two or more wavelengths simultaneously. The generation of multiple wavelengths was first demonstrated for pulsed dye lasers, see for example, H. S. Pilloff, *Appl. Phys. Lett.*, vol. 21, p. 339, 1972; C. Wu and J. R. Lombardi, *Optics Communications*, vol. 7, p. 233, 1973; H. Lotem and R. T. Lynch, Jr., *Appl. Phys. Lett.*, vol. 27, p. 2677, 1975. Dual wavelength operation of a pulsed Ti:sapphire laser has been reported, see for example, G. S. Kruglik, P. N. Nazarenko, N. V. Okldnikov, G. A. Skripko and A. A. Stavrov, *Atmospheric Optics*, vol. 2, p. 729, 1989; and S. G. Bartoshevich, I. V. Mikhnyuk, G. A. Skripko and I. G. Tarazevich, *IEEE. J. Quantum Electronics*, vol. 27, p. 2234, 1991. CW multifrequency operation of a tunable laser was demonstrated for the first time using a Ti:sapphire laser in a coupled cavity configuration, see for example, R. Scheps and J. F. Myers, *IEEE Photonics Technology Letters*, vol. 4, p. 1, 1992.

A dispersing Brewster angle prism 21 is inserted into a region of the laser resonator cavity 15 between the fold mirror 10' and the end reflective mirrors 17 and 17'. Feedback path 17a between prism 21 and highly reflective mirror 17' is spatially separate from feedback path 17b. Similarly, feedback path 17b between prism 21 and highly reflective mirror 17 is spatially separate from feedback path 17a. Feedback along path 17a may be at a substantially different wavelength than feedback along path 17b.

By inserting a high dispersion prism between the gain element 13 and the highly reflective flats 17 and 17', separate feedback paths are established for each wavelength. The use of a Brewster angle prism in minimum deviation provides low insertion loss while minimizing the amount of astigmatism introduced. The resonator mode is collimated as it passes through prism 21. Angular rotation of one of highly reflective flats 17 or 17' allows tuning of one wavelength while leaving the other wavelength unaffected. Alternatively, tuning may be achieved by rotating prism 21. This changes both wavelengths simultaneously while maintaining a constant separation between the two wavelengths. An important feature of the resonator is that both wavelengths emerge from output coupler 19 simultaneously, collimated and spatially overlapped. In addition, the mode, shape and size for each wavelength are similar.

Argon ion laser 12 produces a pumping mode output. The pump laser output, rotated by polarization rotation optics 112, produces a collimated beam 18 that is transformed into a focused pumping beam 18' by an exemplary 25 centimeter lens 14, which focuses the argon ion laser output onto Ti:sapphire crystal 13. The pumping of laser crystal 13 is end pumped to improve the energy conversion efficiency and to assure $TEM_{00}$ operation.

The apparatus for end pumping laser crystal 13 consists of pump laser 12, polarization rotation apparatus 112 and lens 14. The purpose of polarization rotation apparatus 112 is to orient the electric field (E) of the linear polarization of exemplary argon ion pump laser 12 to lie parallel to the crystallographic c axis of the exemplary Ti:sapphire laser crystal. This is done to achieve maximum absorption of the pump power and therefore enhance the pump efficiency.

Note that concave fold mirror 10 should not be plano-concave as is typically used for concave laser mirrors. Instead, the mirror should be concave-convex where the absolute value of the radii of curvature of both mirror surfaces are the same. This is commonly referred to as a "meniscus" lens. This type of mirror substrate is desirable for high efficiency end pumping since, in conjunction with the proper selection of the focal length and position of focusing lens 14, it will provide virtually no distortion to the focused end pumping beam 18' as the beam passes through concave fold mirror 10. This will be true only when the radius of curvature of the focused pump beam matches the absolute value of the radii of curvature of both surfaces of meniscus mirror 10.

The importance of the region of the resonator where the wavelengths are spatially separated is that perturbations can be introduced that affect only one of the wavelengths. For example, one wavelength may be amplified or attenuated without affecting the magnitude of the other. This could be important, for example, when the two fundamental wavelengths which are required to operate simultaneously experience substantially different round trip gain in the resonator.

In addition, a modulator can be inserted to provide amplitude modulation at one wavelength, or modulators at both wavelengths can be introduced to generate arbitrary phase and frequency relationships between the two outputs. Etalons may be inserted to reduce the linewidth at only one of the two wavelengths, or attenuators may be introduced to reduce the intracavity power at either wavelength. An alternative method of reducing the intracavity power at one wavelength is to replace the appropriate HR flat, 17 or 17', with a partial reflector.

Dispersing Brewster angle prism 21 has uncoated faces and is oriented at Brewster's angle with respect to the laser resonator cavity mode 116. The prism material is a highly dispersive glass typical of the glasses that compose Faraday rotators, and the glass is specifically chosen to have minimum absorption over a preselected range of wavelengths. Suitable materials for the prism are commercially available and may include such glasses as Kigre Corporation M-16 glass and Schott glass SF 55.

Concave fold mirrors 10 and 10' can be provided with 10 centimeter radii of curvature, for example, and are used to concentrate the laser resonator cavity mode in laser crystal 13, which in this exemplary case is a 1.5 centimeter long Ti:sapphire laser crystal having Brewster angle faces. The Brewster angle faces on laser crystal 13 ensure that the fundamental wavelengths oscillating in laser resonator 15' will be linearly polarized. The two concave fold mirrors are provided with exemplary broadband highly reflective coatings over the range of 670 nm to 850 nm. Two highly reflective end mirrors 17 and 17' are also broadband coated to be highly reflective from 670 nm to 850 nm, while output coupler 19 is appropriately treated in this exemplary case to be approximately 95 percent reflective over this wavelength range.

Independent tuning of each of the two resonant wavelengths is obtained by angular adjustment of flat mirror 17 or 17'. The resulting tuning occurs only at the wavelength which is being fed back through prism 21 by the particular mirror that is being rotated. For example, rotating mirror 17' about the axis perpendicular to the plane of FIG. 1A will feed back a different wavelength to prism 21 along path 17a but will not affect the feedback wavelength of mirror 17.

Alternatively, prism 21 can be rotated to tune both wavelengths simultaneously. In tuning the output wavelengths with the prism, the wavelength separation between the two resonant wavelengths is held approximately constant while the individual wavelengths change simultaneously. Two separate feedback paths 17a and 17b through the prism are provided by the pair of highly reflective end elements, mirrors 17 and 17'. The prism is typically oriented with respect to mirrors 17 and 17' so that the peak emission wavelength, in this exemplary case 780 nm, is beyond the interior edge of red mirror 17'. Mirror 17' is termed "red" because this mirror receives the longer wavelengths of the two wavelengths.

A sample trace of dual wavelength operation is shown in FIG. 1B, labelled 101$i$. In this exemplary case cw, dual wavelength operation is achieved simultaneously at 750 nm and 830 nm. The trace was acquired by introducing the output of tunable laser 11, which emerges through output coupler 19, into a spectrometer. The spectrometer uses an optical multichannel analyzer as a detector. Trace 101$i$ in FIG. 1B is a recording of the laser output dispersed by a spectrometer and then incident on the optical multichannel optical analyzer.

Not all wavelength pairs that are contained within the laser tuning range are observed to operate simultaneously, and the range of frequencies over which simultaneous multifrequency operation can occur is determined primarily by gain competition. The phenomenon of gain competition prevents operation at two frequencies where the net gain (which is the gain minus all losses) for one wavelength is substantially lower than that of the other. Note that if one of highly reflective flats 17 or 17' is blocked, the wavelength dependence of the monochromatic output power is due to the spectral variation of the net gain. This variation is well known and is typically called the tuning curve of a given laser. Since the pump power is constant while the output power varies with the output wavelength, the spectral dependence of the power for a given laser can be interpreted as a measure of the efficiency of producing one wavelength relative to another. The greater the difference in output efficiency between two wavelengths, the more difficult it is for the output wavelength with the lower efficiency to compete with that having the higher efficiency. This output efficiency is similar to the net gain.

Figure 2:
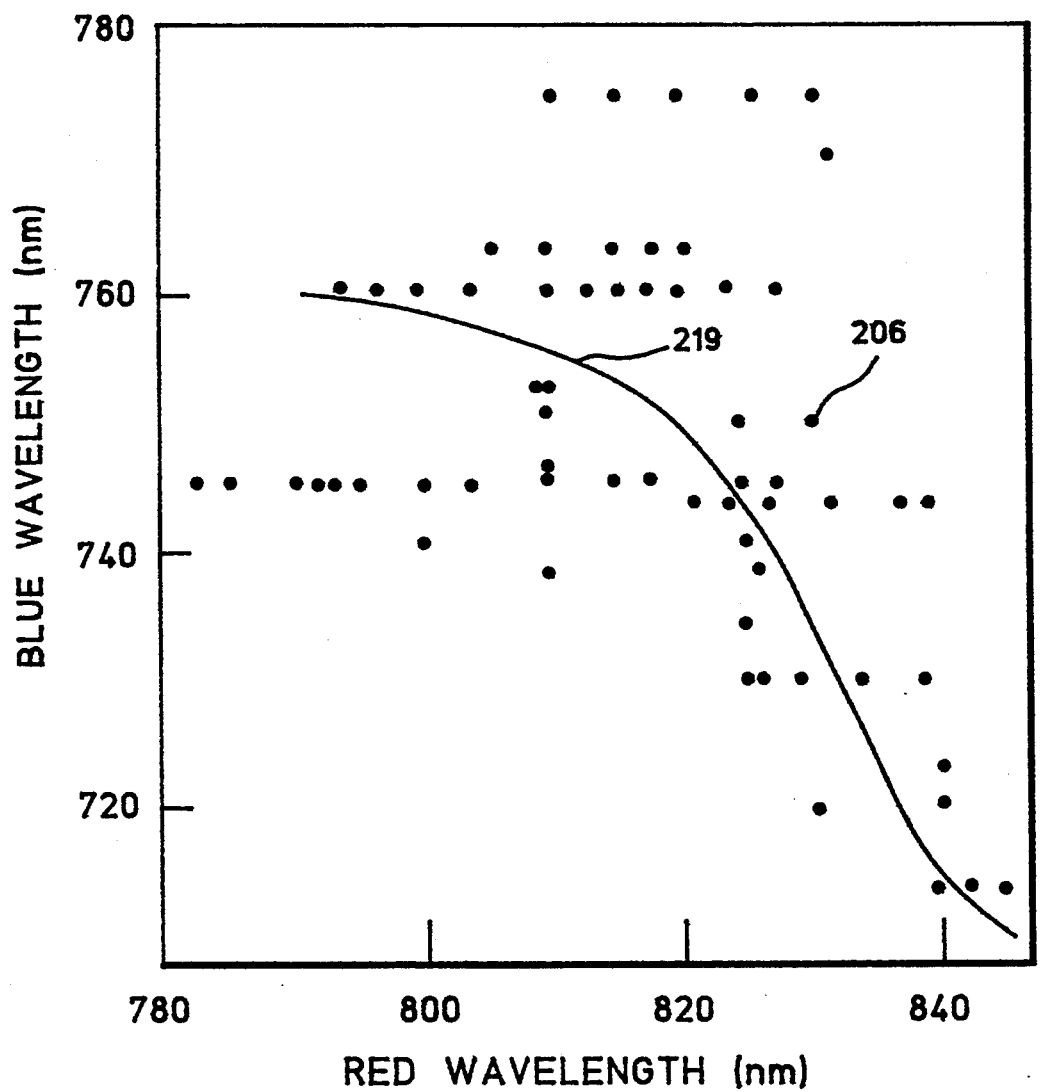
FIG. 2 represents a sampling of wavelength pairs produced simultaneously by the laser illustrated in FIG. 1A.

For the dual wavelength laser illustrated in FIG. 1A, the wavelength pairs which demonstrate stable, simultaneous cw operation are those which produce comparable single wavelength output power. Referring to FIG. 2, a sampling of data pairs for which simultaneous dual wavelength operation was achieved with the exemplary laser are indicated by filled circles. For example, filled circle 206 indicates that simultaneous operation was obtained at 750 nm and 830 nm. This wavelength pair is the same as that used in FIG. 1B. Solid line 219 in FIG. 2 represents the locus of wavelength pairs for which the output efficiency is approximately equal. This line was obtained by blocking one of the end reflectors as described above for the exemplary dual-wavelength laser and represents wavelength pairs on either side of the peak output (780 nm in this exemplary case) for which the output power is approximately equal. As expected from the above discussion, the data points representing simultaneous cw operation are concentrated near this line. Gain competition limits the tuning range for dual wavelength operation.

Figure 3:
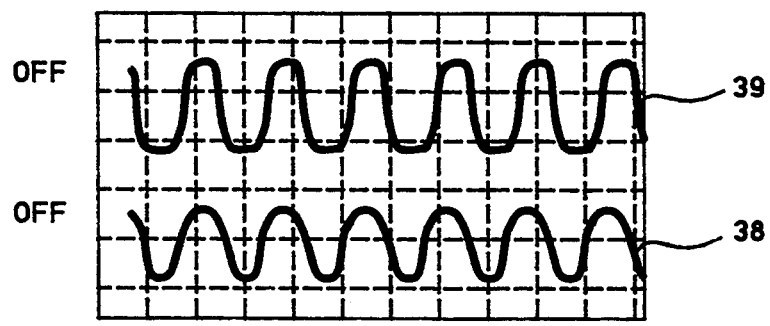
FIG. 3 illustrates an oscilloscope trace of both wavelengths of the laser in FIG. 1A to demonstrate cw simultaneous operation.

In order to verify that both wavelengths are produced simultaneously, the laser output emerging from output coupler mirror 19 is dispersed by a diffraction grating, and each wavelength is detected by a separate photodiode. Stable simultaneous cw output was observed at both wavelengths. A representative oscilloscope trace is shown in FIG. 3. In this figure simultaneous dual wavelength operation is obtained at 750 nm and 830 nm. Chopping is used to provide a baseline for the traces and the zero voltage location for each trace is indicated in the figure as "off." The time scale is 2 milliseconds per division.

The upper trace, 39, depicts the 750 nm signal, while the lower trace, 38, depicts the 830 nm signal. It can readily be seen that both wavelengths are on simultaneously when the chopper is open and off simultaneously when the chopper is shut. It is to be noted that long-term amplitude stable simultaneous cw operation was also obtained at both 750 nm and 830 nm.

Line narrowed operation was obtained by inserting an etalon pair 170 in the collimated region of the resonator between prism 21 and highly reflective flat 17. The etalons in this exemplary case were 0.5 and 10 mm thick. The resulting linewidth was measured to be no greater than 450 MHz, the resolution limit of the measuring apparatus. The linewidth at the wavelength represented by path 17a in FIG. 1A, which is the longer of the two wavelengths, was unaffected. It is also possible to narrow the linewidth of both wavelengths simultaneously by introducing the etalon pair in the collinear region of the resonator between output mirror 19 and fold mirror 10. Alternatively, an etalon pair or other line narrowing means can be inserted in the wavelength feedback path between prism 21 and highly reflective element 17' to produce line narrowing at the wavelength fed back by mirror 17'.

Spatial overlap between the laser resonator cavity mode axes for the two wavelengths is obtained only in the region of the resonator between output coupler 19 and the face of Ti:sapphire laser crystal 13 closest to the output coupler. This face is labeled 13i in FIG. 1A. Owing to dispersion, the mode axes do not coincide in the gain element although the beam diameters are large enough to produce significant overlap. This is shown schematically in FIG. 4.

Figure 4:
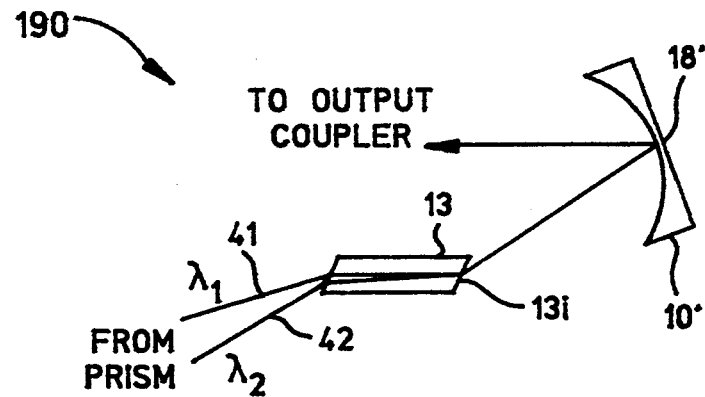
FIG. 4 illustrates the feedback paths of each wavelength in the region of the gain element when the laser of FIG. 1A is properly aligned.

In FIG. 4 a region 190 of laser resonator 15' from FIG. 1A is shown and includes Ti:sapphire gain element 13 and fold mirror 10. The region of the laser resonator shown in FIG. 4 is depicted in phantom 190 in FIG. 1A. The resonator mode axes, labeled 41 and 42, corresponding to the two wavelengths, $\lambda_1$ and $\lambda_2$, respectively, are shown spatially separated by a relatively small amount. For ease of understanding FIG. 4 the propagation direction is taken to be from prism 21 towards output mirror 19. Note that since laser resonator 15' is a standing wave laser resonator, the opposite propagation direction is also present.

Upon entering the first Brewster face of the laser gain element, wavelengths $\lambda_1$ and $\lambda_2$ propagating along resonator mode axes 41 and 42 refract at different angles owing to the dispersion of the Ti:sapphire gain element. By the time these mode axes reach the opposite face of the Ti:sapphire gain element, 13i, they are spatially overlapped but not collinear. Upon refraction through the second Brewster face in the direction of concave fold mirror 10, both wavelengths become spatially collinear and remain so through reflection from concave fold mirror 10 to output coupler 19. For the flux that is reflected back into laser resonator 15' by output coupler 19, these two wavelengths stay spatially collinear until they reach Brewster window 13i of Ti:sapphire laser crystal 13, at which point they refract and retrace their paths back towards concave fold mirror 10' and prism element 21.

To a certain extent, the fact that the two wavelengths interact with the population inversion in somewhat separate active volumes within laser crystal 13 contributes to the observed stability for dual wavelength operation. The term "population inversion" refers to the phenomenon where the population of ions in the upper laser level is higher than the population of ions in the terminal level for the laser transition. A population inversion leads to optical gain at the laser transition and is generally required for laser operation. An additional contribution to the stability may arise from spatial hole burning which allows efficient extraction for one wavelength in regions in the active gain element corresponding to amplitude minima for the standing wave representing the other wavelength. Although each wavelength does not typically operate in a single longitudinal mode, the bandwidths for both wavelengths are relatively narrow, typically 0.01 nm.

A salient feature of the laser resonator cavity design shown in FIG. 1A should be reemphasized. This is that the laser resonator cavity mode can be thought of as having two distinct regions, one where the wavelengths are spatially separate, and the other where the wavelengths are spatially collinear. The region where the wavelengths are spatially separate includes the region extending from prism element 21 to highly reflective flats 17 and 17'. The region where the wavelengths are spatially collinear, as illustrated in FIG. 4, extends from Brewster face 13i of Ti:sapphire laser crystal 13, to output coupler 19.

In the region where the wavelengths are spatially separated, one wavelength can be modulated without affecting the other. This can be done, for example, by insertion of a shutter or an electro-optic or acousto-optic Q-switch 170, as shown in FIG. 1A. In addition, operation at one wavelength can be enhanced by insertion of amplifiers in path 17a or 17b. Furthermore, the insertion of line narrowing elements in one wavelength path will narrow that wavelength without affecting the bandwidth of the other.

The importance of having a region where both wavelengths are spatially collinear is that for intracavity sum frequency generation where the two wavelengths are summed in a non-linear crystal to produce a third, shorter wavelength, it is required that both wavelengths be spatially collinear through the non-linear crystal. The region where both wavelengths are collinear is the best location for the non-linear sum frequency generating crystal.

Optionally, pump laser 12 can be laser diodes, aluminum gallium arsenide or indium gallium arsenide or aluminum gallium indium phosphide or can be other cw laser sources such as a doubled Nd:YAG laser or a dye laser, for example, or any other source, the output of which is absorbed by laser crystal 13. In addition, laser crystal 13 can be any length. In the exemplary case it is 1.5 centimeters long. The length is selected to provide adequate gain at the desired operating wavelength and adequate absorption of the pump laser power.

In addition to adjusting the length, the concentration of the dopant material is adjustable. In the exemplary case the $Ti^{3+}$ doping density is 0.15 percent by weight. Densities as high as 0.25 percent of $Ti^{3+}$ by weight may be used for Ti:sapphire. For other dopant and host combinations in other laser gain media, the dopant density generally will be adjusted in accordance with the following general guideline. The absorption of pump light by the crystal, which is determined by the optical path of the pump light through the crystal, should be sufficiently high, usually in the range of 80 to 100 percent. In addition, the amount of absorbed pump light affects the gain, and the gain minus the passive losses in the crystal must be adequate to provide operation over a predetermined range of wavelengths.

Non-laser sources such as arc lamps or cw filament lamps or flash lamps or other gas filled lamps can be used to excite the laser gain element. For pulsed excitation the output of the laser fabricated in accordance with this inventive concept will be pulsed. For cw excitation the operation will be either cw or pulsed depending on whether elements for interrupting cw operation are inserted into the laser resonator cavity. Dual wavelength operation in the pulsed mode generally can be achieved over a wider tuning range than cw operation since the initial gain is much higher. However, achieving output at both wavelengths which are temporally identical is much more difficult to achieve, since pulse build-up times depend on the net gain at each wavelength.

Mirror coatings are important factors for determining the net gain as a function of the wavelength of the laser. This is an important consideration when operation at two wavelengths is desired where the stimulated emission cross-section for each wavelength is very different. As mentioned previously, wavelengths pairs where the net gain is approximately the same readily operate simultaneously. The net gain curve can be tailored to obtain the desired dual wavelength operation at any two wavelengths by adjusting the mirror reflectivities at the two desired wavelengths either to reduce the net gain at a wavelength where the stimulated emission cross section is much higher than that at the other wavelength, or to increase the net gain at a wavelength where the stimulated emission cross-section is much lower than the other.

Selecting reflectivities for mirrors 17, 17', 10, 10' and 19 in FIG. 1A such that the reflectivity is enhanced or degraded at specific wavelengths will allow operation of selected wavelength pairs within the tuning range capability of the laser. Any wavelength pair over the range for which laser crystal 13 can operate can be produced simultaneously by tailoring the spectral reflectivity of the optical elements in the manner just described. In the exemplary case of Ti:sapphire the tuning range is 680 nm to 1.1 $\mu$ and the reflectivity of flat output coupler 19, fold mirrors 10 and 10' and flat mirrors 17 and 17' of FIG. 1A can be tailored, for example, to achieve operation at any desired wavelength pair over a preselected range of wavelengths. Similarly, the spectral reflectivity of the reflective elements of other embodiments of this inventive concept can be chosen to provide multifrequency operation at any pair of wavelengths for which there is net gain.

Figure 5:
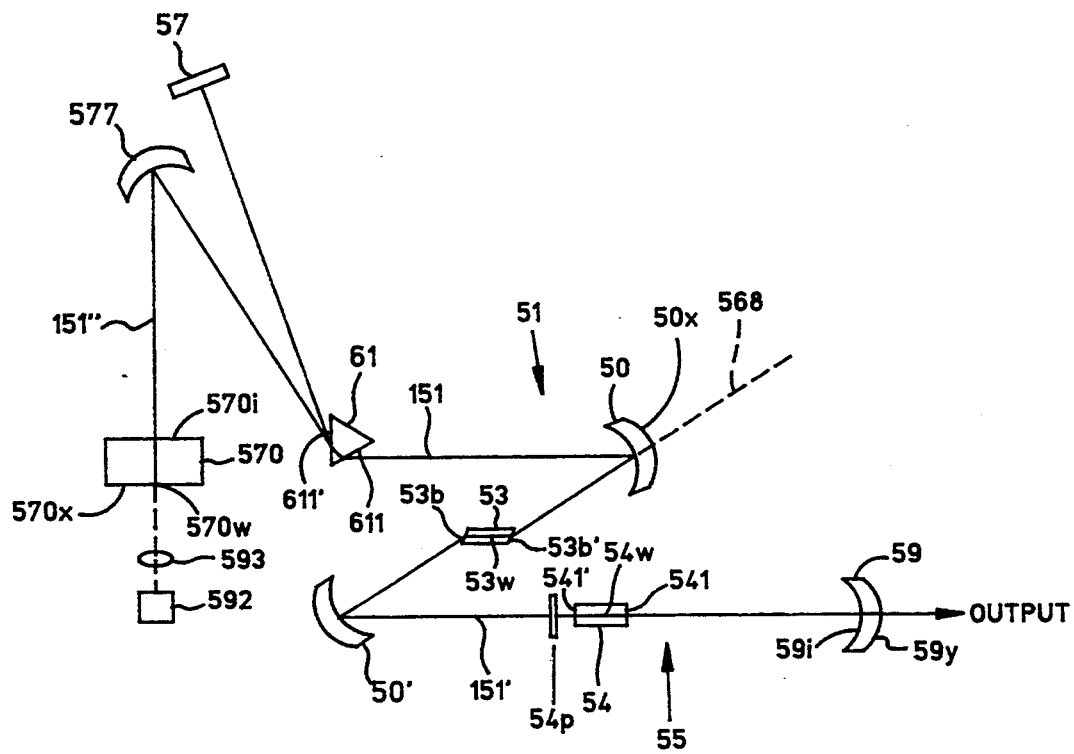
FIG. 5 represents a first embodiment of the invention.

A first embodiment of this inventive concept is illustrated in FIG. 5. For ease of understanding this concept, the intracavity sum frequency generation process will be described in terms of Type II sum frequency generation of 808 nm and 1.064 $\mu$ fundamental wavelengths to produce 459 nm, and the laser will be described in terms of an argon ion laser-pumped, dual wavelength Ti:sapphire laser operating at the two fundamental wavelengths. However, it is to be understood that within the scope of this inventive concept any pair of wavelengths can be summed to produce a third wavelength given by equation 1, and gain media other than Ti:sapphire may be used to produce the two fundamental wavelengths. Note that the term "laser crystal" is used to refer to a specific type of "laser gain element", and in referring to the Ti:sapphire laser rod in FIG. 5, element 53 may be appropriately called "Ti:sapphire laser crystal 53" or "Ti:sapphire laser gain element 53", or more generally "laser gain element 53" or "laser crystal 53". The pumping mode and resonator mode are focused at a waist 53w in element 53.

In order to achieve efficient intracavity sum frequency generation several important modifications need to be introduced into the basic design illustrated in FIG. 1A. Intracavity sum frequency generation proceeds by operating tunable laser 51 shown in FIG. 5 at 808 nm and 1.064 $\mu$ simultaneously. This is achieved by applying appropriate coatings to the reflective elements contained in laser resonator cavity 55. Exemplary 10 cm radius of curvature fold mirrors 50' and 50 have coatings which are highly reflective at both 808 nm and 1.064 $\mu$ for the appropriate angle of incidence. In this exemplary case this angle of incidence is 14° and refers to the angle of incidence of laser resonator cavity mode 151 with respect to the normal to the surface of 10 centimeter radius concave fold mirrors 50 and 50'. Exterior face 50x of fold mirror 50 is coated for high transmission of converging optical pump beam 568 emanating from an argon ion laser (not shown).

Mirror 59 is an exemplary 10 cm radius of curvature mirror with an interior surface 59i coated to be highly reflective at 808 nm and 1.064 $\mu$ and simultaneously highly transmissive at 459 nm. The rear surface of mirror 59, indicated as 59y in FIG. 5, is anti-reflective coated for 459 nm radiation. This mirror then serves as the output coupler for 459 nm sum frequency generated output from tunable laser 51.

A non-linear crystal 54, which in this exemplary case is KTP cut along the crystallographic XYZ axes for Type II non-critically phase matched sum frequency generation of 808 nm and 1.064 μ, is located at a second waist 54w within dual wavelength laser resonator cavity 55. Establishing laser resonator cavity mode waist 54w at the location occupied by the KTP crystal can be accomplished by replacing flat output coupler 19 of FIG. 1A with concave output coupler, or mirror, 59. Concave output mirror 59 can be identical to fold mirrors 50 and 50': in this exemplary case, output mirror 59 has a 10 cm radius of curvature (ROC), and is coated HR from 800 nm to 1.064 μ and highly transmissive (HT) from 450 nm to 514 nm. The spacing between output mirror 59 and fold mirror 50' is adjusted to provide a nearly concentric configuration of laser resonator cavity mode 151' in the region between fold mirror 50' and output mirror 59. The nearly concentric cavity mode configuration provides a very small waist diameter, and in this exemplary case, the diameter of waist 54w at 808 nm in KTP crystal 54 is 25μ.

Second waist 54w provides increased power density for the fundamental wavelengths within non-linear crystal 54 and therefore increases the conversion efficiency. An additional benefit gained by the placement of KTP crystal 54 in the location shown in FIG. 5 (relative to a position in one of the other regions as was disclosed in U.S. patent application Ser. No. 08/108,131 is that wave plate 54p and non-linear crystal 54 are not as confined spatially. It is therefore simpler to adjust the position and angular orientation of each. The two optical faces of KTP crystal 54, 541 and 541', are coated to be anti-reflective (AR) for both fundamental wavelengths in this exemplary case. Due to the short length of KTP crystal 54 relative to the confocal parameter of laser resonator cavity mode 151', reflections from AR coated faces 541 and 541' of KTP crystal 54 match laser resonator cavity mode 151' and therefore do not contribute to the passive losses. This is important for maintaining a low insertion loss for KTP crystal 54 since the AR coating on KTP crystal faces 541 and 541' is 0.5% reflective at 808 nm for each surface.

The KTP crystal used in this exemplary case was flux grown, XYZ cut and is 5 mm long. Faces 541 and 541' of KTP crystal 54 were not anti-reflective coated for 459 nm. The propagation direction is along the Y axis. The 1.064 μ radiation is polarized normal to the Z axis. Because KTP crystals contain impurities or defects that cause absorption in the visible region, both absorption at 459 nm and reflection from surfaces 541 and 541' of KTP crystal 54 were measured for the exemplary KTP crystal used to demonstrate this inventive concept. A series of measurements were performed and the calculated reflectivity at 459 nm was 0.36 per surface.

The measured absorption loss introduced by KTP crystal 54 at 459 nm was somewhat uncertain, ranging from $4.91 \times 10^{-2}$ to $6.93 \times 10^{-2}$ per pass. Absorption of visible radiation by KTP is a result of poor crystal quality and in principle, this absorption can be reduced to zero by the introduction of compensating impurities or by better crystal growth techniques. Although the reflection coefficient of the KTP coatings at 459 nm is relatively large, the measured output power at 459 nm is reduced only as a consequence of absorption by KTP crystal 54. This is a result of the compensation for the reduction in blue power generated in the direction propagating towards the detector, by reflections of blue power generated in the reverse direction from the rear surface of KTP crystal 54.

The Ti:sapphire gain is highest for the orientation of E ∥ c and the Brewster angles on the end faces of the rods support the πpolarization. Thus, in the absence of polarization rotation, the 1.064 μ and 808 nm radiation would have parallel polarization orientation throughout laser resonator cavity 55. Since SFG is Type II in this exemplary case the polarization of the two fundamental wavelengths must be orthogonal in KTP crystal 54. To provide the proper orientation of the polarization within laser resonator cavity 55, multiple order wave plate 54p was inserted between fold mirror 50' and KTP crystal 54. In this exemplary case, wave plate 54p produces an integral number of full wave rotations at 808 nm and an integral number of half wave rotations at 1.064 μ. The two fundamental wavelengths therefore have orthogonal polarization in both propagation directions through KTP crystal 54, but parallel (π) polarization in the Ti:sapphire crystal.

The insertion of wave plate 54p has the following effect on the polarization of the two fundamental wavelengths at 1.064 μ and 808 nm. As these wavelengths emerge from Ti:sapphire laser gain element 53, propagating toward KTP crystal 54, their polarization is parallel. As mentioned, this is required for high gain within the Ti:sapphire laser crystal, as well as by Brewster cut faces 53b and 53b' on Ti:sapphire laser crystal 53. As a consequence of passing through wave plate 54p, the polarization at 808 nm is unchanged relative to its initial polarization within Ti:sapphire laser crystal 53, while the polarization of the 1.064 μ radiation is rotated 90° by wave plate 54p with respect to its initial polarization orientation. Therefore, as these two fundamental wavelengths propagate into KTP crystal 54, their polarizations are orthogonal as required by the Type II non-linear sum frequency generation process.

KTP crystal 54 does not change the polarization orientation of the two fundamental wavelengths so that as they emerge from KTP crystal 54, the polarizations remain perpendicular with respect to one another. Thus, as the waves continue to propagate to concave output mirror 59, the orientation of the two fundamental wavelengths remain perpendicular. Reflections by mirror 59 also does change the orientation of the two polarizations, so that the two fundamental wavelengths reflected by mirror 59 back towards KTP crystal 54 remain perpendicular. This perpendicular orientation is maintained for the reflected wave as it propagates through KTP crystal 54 in the reverse direction, towards wave plate 54p.

As a consequence of the reflected wave passing through wave plate 54p towards Ti:sapphire laser crystal 53, the polarization orientation of the two fundamental wavelengths are changed once more. Upon emerging from wave plate 54p, propagating towards Ti:sapphire laser gain element 53, the 808 nm polarization orientation is again unchanged, but the 1.064 μ radiation is once again rotated by 90° with respect to its orientation upon entering KTP crystal 54. At this point the polarization of the two fundamental wavelengths are once again parallel. Therefore, prior to passing through laser crystal 53 towards fold mirror 50 the polarization of the two fundamental wavelengths are once again parallel, allowing high gain for both wavelengths upon passing through laser gain element 53.

Note that a wave plate that produces an integral number of full wave rotations at 1.064 μ and an integral number of half wave rotations at 808 nm will produce the same benefits as wave plate 54p described above. That is, in this case, the two fundamental wavelengths will have orthogonal polarization in both propagation directions through non-linear KTP crystal 54 and parallel polarization in Ti:sapphire laser crystal 53. However, since the NCPM Type II SFG process requires that the 1.064 μ radiation be polarized normal to the Z axis of KTP crystal 54, the use of a half wave plate which effectively rotates the polarization of the 808 nm radiation rather than that of the 1.064 μ radiation requires an accommodating rotation of KTP crystal 54 by 90° about the axis parallel to laser resonator cavity mode 151'. This allows the Z axis of KTP crystal 54 to be aligned normal to the 1.064 μ radiation. In all other respects the use of either type of wave plate will produce identical results. Wave plate 54p is anti-reflective coated on its input and exit faces for 808 nm and 1.064 μ.

HR end reflective element 57 is coated to be highly reflective at 808 nm. Prism 61 is one or more prisms made in this exemplary case of Schott glass SF 55. The important criteria for the prism material in this exemplary case is that it has high dispersion and extremely low absorption at both 808 nm and 1.064 μ. Dispersion refers to the refractive index variation with optical wavelength. Many glasses which satisfy the condition of high dispersion also have high absorption losses, particularly at 1.064 μ. While numerous glasses may be satisfactory for this application, Schott SF 55 glass is used in this exemplary case because it is readily available in the high optical quality required for intracavity laser operation. In addition, it has high dispersion and has very low absorption losses at both 808 nm and 1.064 μ. This glass has an Abbe value of 26.95, which indicates high dispersion, and an absorption of less than 0.1% /cm at both 808 nm and 1.064 μ. Prism 61 has Brewster cut optical faces and is oriented for minimum deviation. Optical faces 611 and 611' of prism 61 are optically polished and oriented so that when prism 61 is in minimum deviation the angle that laser resonator cavity mode 151 makes with the two prism optical faces 611 and 611' is Brewster's angle. Laser gain element 53 in this exemplary case is a 0.15 percent doped $Ti^{3+}$:sapphire laser rod with Brewster angle faces. It is 1.5 centimeters long.

The most significant modifications to the basic dual wavelength resonator, illustrated in FIG. 1A, involve those required to produce simultaneous operation at 808 nm and 1.064 μ. As noted above, the laser will not produce two wavelengths simultaneously if the net gain for one wavelength is substantially lower than for the other. This is due to gain competition and will be a limitation even though each of the two desired wavelengths is produced when the feedback mirror for the other is blocked (sequential operation). The stimulated emission cross section for Ti:sapphire at 1.064 μ is only about 20% of that at 808 nm. Generally speaking, operation beyond 1μ is simply not efficient for a Ti:sapphire laser. Based on the relative cross sections then, it is obvious that some substantial modification to the resonator is required to produce simultaneous cw operation at 808 nm and 1.064μ.

In general the spectral dependence of the net gain is a function of the spectral dependence of the mirror coatings, the passive losses and the stimulated emission coefficient. The options for producing comparable net gain at both wavelengths are limited. Reducing the passive loss at 1.064 μ is not productive since the resonator losses at both fundamental wavelengths, 808 nm and 1.064 μ, are already low, on the order of only a few tenths of a percent per pass.

Another means of equalizing the net gain at the two fundamental wavelengths is to increase the losses at 808 nm. One way this can be accomplished is by replacing HR end mirror 57 (for the 808 nm path) with a partial reflector. In this case the intracavity circulating power at 808 nm is lowered. The best approach, however, is to find a means for increasing the net gain at 1.064 μ rather than reducing it at 808 nm.

This is accomplished in this inventive concept by replacing HR end mirror 17' of the tunable laser 11 illustrated in FIG. 1A with an end-pumped Nd:YAG "active mirror" 570. While the term "active mirror" has a specific meaning for phase correction of propagating beams, it is used here to underscore the contrast to a passive mirror, i.e., one with no gain. In the configuration illustrated in FIG. 5 Nd:YAG active mirror 570 serves not only as an optical amplifier but as an end reflector as well.

Active mirror 570 is composed of an exemplary 1.1% Nd:YAG substrate. The interior face 570i of active mirror 570 is coated AR at 1.064 μ. The exterior face 570x of active mirror 570 is coated HR at 1.064 μ and HT at 808 nm. Faces 570i and 570x are optically polished, flat and parallel to one another. The separation between these two faces (i.e., the thickness of active mirror 570) is 1 cm. The Nd:YAG substrate must be laser quality material.

In this exemplary case, Nd:YAG active mirror 570 is optically end-pumped with single stripe high power cw laser diode 592. Laser diode 592 emits at 808.5 nm for efficient absorption by active mirror 570 of the emitted diode radiation. However, it is to be understood that any optical source emitting in a wavelength range which is suitable for optically exciting the $Nd^{3+}$ ion to the upper laser level ($^4F_{3/2}$) in Nd:YAG could be used to optically pump active mirror 570.

To make efficient use of the active mirror as an end-pumped amplifier a laser resonator cavity mode waist 570w should be located at exterior face 570x. This is accomplished in this exemplary case by using 25 cm ROC fold mirror 577 shown in FIG. 5. Without fold mirror 577 laser resonator cavity mode 151 would be collimated as it passes through active mirror 570. In this exemplary case it would have a diameter of approximately 1 mm. End-pumping active mirror 570 with laser diode 592 would not provide enough gain for a collimated laser resonator cavity mode and consequently dual wavelength operation would not be achieved.

Using fold mirror 577, however, laser resonator cavity mode 151'' is not collimated but converges between fold mirror 577 and active mirror 570. The laser resonator mode converges to waist 570w in active mirror 570. The net gain at 1.064 μ is substantial, and simultaneous dual wavelength operation can be achieved. In order to provide efficient matching between the pump emission from laser diode 592 and laser resonator cavity mode 151'', the output of laser diode 592 is first collimated and then focused to a waist at or near face 570x of active mirror 570. Collimation and focusing is accomplished with lens set 593.

Figure 6:
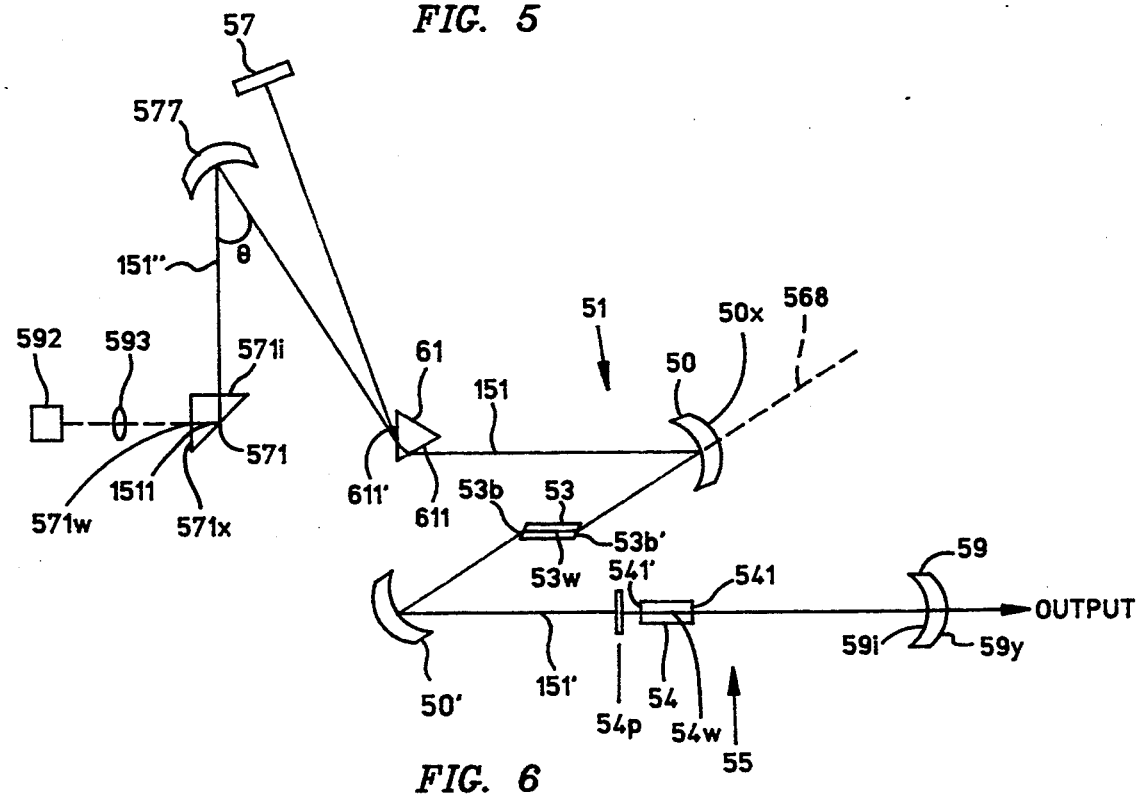
FIG. 6 represents a second embodiment of the invention.

A second embodiment of this inventive concept is illustrated in FIG. 6. This embodiment is similar to that illustrated in FIG. 5, except that active mirror 570 is replaced with active mirror 571. Active mirror 571 is cut in the shape of a small isosceles right angle prism. It is composed of 1.1% Nd$^{3+}$ in YAG. Active mirror 571 was first demonstrated as the gain element of an efficient, scalable diode pumped laser that produced over 1.3 W TEM$_{oo}$, see for example R. Scheps and J. F. Myers, *IEEE Journal of Quantum Electronics*, vol. 28, p. 1640, 1992. One of the two orthogonal prism faces, face 571x, is coated HR at 1.064 μ and HT at 808 nm. The other orthogonal face, face 571i, is coated AR at 1.064μ.

The geometry of active mirror 571 has several features that make it highly appropriate for this inventive concept. For one, when optically pumped the 1.064 μ output from active mirror 571 is π polarized, which coincides with the polarization of the 1.064 μ output from Ti:sapphire laser crystal 53. In addition, its small size and the 90° internal fold 1511 of the laser resonator cavity mode allow it to be placed close to the 1.064 μ beam path externally folded by fold mirror 577. This ensures a tight fold angle θ at fold mirror 577 without clipping either by active mirror 571 itself or by laser diode 592 or its associated pump optics 593. Some uncompensated astigmatism is introduced in the cavity due to the off-axis orientation of exemplary 25 cm ROC mirror 577. However, by maintaining the fold angle θ at less than 2° in this exemplary case, the resulting astigmatism is small and the laser operation is efficient. Using the laser configuration illustrated in FIG. 6, the intracavity power at 1.064 μ was comparable to the power at 808 nm.

Figure 7:
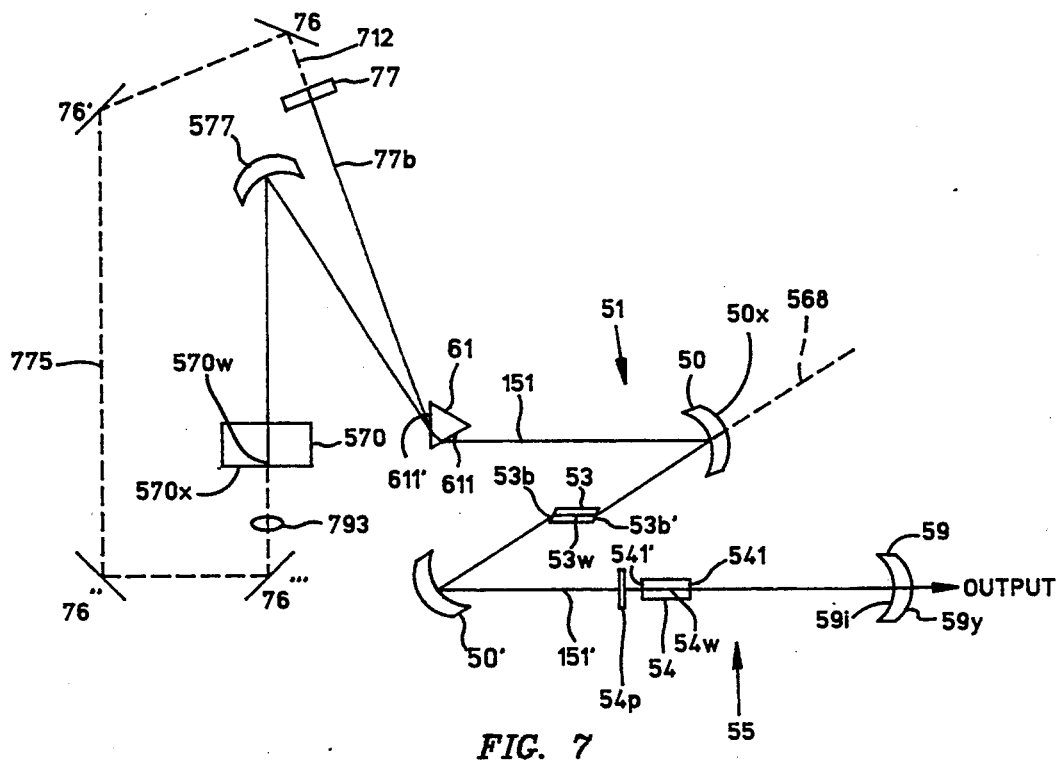
FIG. 7 represents a third embodiment of the invention.
Figure 8:
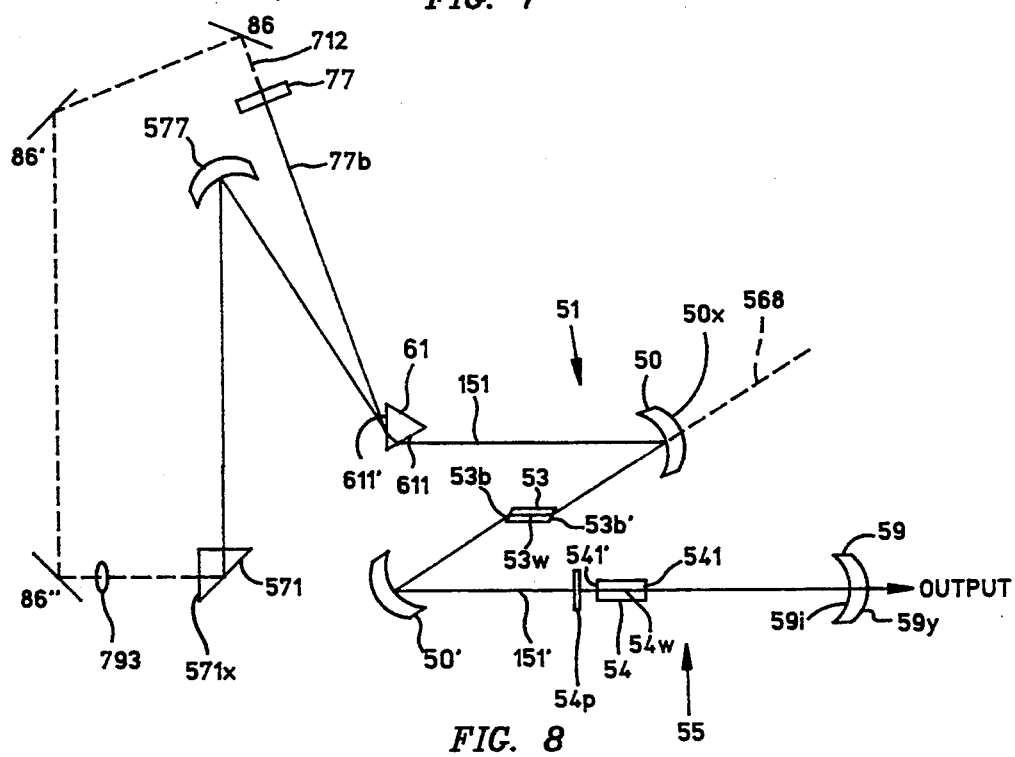
FIG. 8 represents a fourth embodiment of the invention.

As an alternative to diode pumping, the active mirror can be pumped directly with the 808 nm power produced by the Ti:sapphire laser. FIG. 7 illustrates one embodiment of this inventive concept. Plane parallel active mirror 570 is illustrated, which is substantially similar to the active mirror described and illustrated in the embodiment of FIG. 5. A partial reflector 77, which may be for example 99% reflective for 808 nm, provides an output 712 at 808 nm which is then used to pump Nd:YAG active mirror 570. Flat mirrors 76, 76′, 76″ and 76‴ are used in this exemplary case to steer the 808 nm output 712 from partial reflector 77 to a position where active mirror 570 can be pumped. A focusing lens 793 is used to focus the 808 nm pump light, which is collimated, onto face 570x of active mirror 570. The pump beam focus occurs at or near resonator mode waist 570w. Another embodiment of this inventive concept is illustrated in FIG. 8. This embodiment is similar to that shown in FIG. 7 except that active mirror 571 of FIG. 6 is used. The output 712 at 808 nm is steered by mirrors 86, 86′ and 86″, through focusing lens 793 to pump active mirror 571.

The embodiments of this inventive concept illustrated in FIGS. 7 and 8 are effective for obtaining dual wavelength operation. The applicability of these two specific embodiments is limited to situations where a suitable wavelength for resonant optical pumping of the active mirror is close to the desired wavelength for SFG. In addition, note that in these two embodiments the intracavity power at 808 nm is reduced by coupling out part of the light, and this reduces the generated power at the sum frequency. On the other hand, the elimination of the pump laser diode 592 in these two embodiments is a compelling argument in favor of using this type of configuration for intracavity SFG.

The resonators shown in FIGS. 5, 6, 7 and 8 may be best described as coupled cavity configurations. The laser is composed of two cavities and two gain elements. By blocking one of the feedback paths the laser operates as a single wavelength emitter at either 808 nm or 1.064 μ, depending on which mirror is blocked. The cavities overlap spatially in the region containing non-linear crystal 54. As a consequence, efficient SFG is ensured. On the other hand, the two wavelengths are dispersed by prism 61 so that none of the 808 nm power passes through the Nd:YAG active mirror. Therefore absorption of the 808 nm power by the Nd:YAG active mirror does not occur and high intracavity power is maintained at both wavelengths. The ability to maintain high intracavity power at 808 nm which is not absorbed by a Nd:YAG gain element is an important feature of this inventive concept. The spatial intensity profile for each fundamental wavelength is almost identical, adding to the effectiveness of the SFG process described in this inventive concept. The laser diode pump power at the active mirror can be used to regulate the intracavity power at 1.064μ.

The lasers illustrated in FIGS. 5–8 were tested and operated stably and efficiently while producing cw output at both 808 nm and 1.064 μ simultaneously. They were capable of producing line narrowed or repetitively Q-switched 459 nm output. The output is readily scalable, and as much as 109 mW was produced at 459 nm. This is the highest cw power reported for this type of sum frequency process.

Evaluation of the four embodiments represented by FIGS. 5–8 was performed, and detailed results using the embodiment illustrated in FIG. 6 is presented. Initial laser performance was evaluated at the two fundamental wavelengths. All measurements were performed with pump powers of 5 W for the ion laser along path 568 and 2 W for laser diode 592. The measured unidirectional intracavity power was 7.92 W and 9.95 W at 808 nm and 1.064 μ, respectively. A partial reflector suitable for producing output at 808 nm and 1.064 μ simultaneously was not available, and therefore optimum output power at these two wavelengths could only be measured with the laser operating as a single wavelength emitter. The best output power was 402 mW and 275 mW for 808 nm and 1.064 μ, respectively.

When used for intracavity SFG the laser produced 109 mW at 459 nm. The peak blue wavelength was 459.10 nm and corresponds to a value for the tunable fundamental wavelength of 807.5 nm. This wavelength was determined with an optical multichannel analyzer (OMA) which has an accuracy of about 0.1 nm. The generated power can be compared to the optimum 459 nm, see for example G. D. Boyd and D. A. Kleinman, *J. Appl. Phys.*, vol. 39, p. 3597, 1968, power using the expression, see for example S. Singh in *Handbook of Laser Science and Technology*, M. J. Weber, Ed., CRC Press, Boca Raton, Fla., vol. III pp. 3–21, 1986, $$P_3 = 3.35 l_c h P_1 P_2 \qquad (2)$$

where $P_3$ is the total generated power in mW, $P_1$ and $P_2$ are the fundamental powers in W, $l_c$ is the KTP crystal length in mm, and h is a dimensionless focusing parameter. The constant in Eq. 2 is obtained from the values for KTP, see for example J. -C. Baumert, F. M. Schellenberg, W. Lenth, W. B. Risk and G. C. Bjorklund, *Appl. Phys. Lett.*, vol. 51, p. 2192, 1987. The KTP absorption at 459 nm is taken into account in Eq. 2 by including in the constant the term $\exp[-\frac{1}{2}\alpha l_c]$ where α is the absorption coefficient of KTP at 459 nm calculated from the transmission measurement described above. Although there is some uncertainty in this measurement, the exponential term varies only from 0.97 to 0.98 for the range of α reported above.

If $P_1$ in Eq. 2 represents the 808 nm intensity, then $P_2$ in Eq. 2 represents the 1.064 μ intracavity intensity. It can be seen from Eq. 2 that there is a great advantage to having the intensities $P_1$ and $P_2$ approximately equal compared to the situation where one or the other intensity strongly dominates. This, of course, assumes that $P_1+P_2$, the two fundamental powers, are constant. For example, if $P_1$ is 1 W and $P_2$ is 1 mW, the product $P_1P_2$ is $1\times10^{-3}$ $W^2$. On the other hand, if $P_1=P_2=500$ mW, then the product $P_1P_2$ is $2.5\times10^{-1}$ $W^2$. Therefore, the situation where both $P_1$ and $P_2$ are 500 mW will produce 250 times as much 459 nm sum frequency generated output than the situation where $P_1$ is 1 W and $P_2$ is 1 mW, although in both cases the sum of the intracavity powers is identical and approximately equal to 1 W.

Therefore for efficient intracavity sum frequency generation it is required that the intracavity power, which is the direct function of the optical pump power (among other things), be distributed as evenly as possible between the two fundamental wavelengths. Note that in the numerical example cited above the sum frequency generated power $P_3$ in the case where $P_1$ is 1 W and $P_2$ is 1 mW is identical to the situation where $P_1=P_2=30$ mW, all other factors being the same. Therefore, with an intracavity power of 60 mW distributed evenly between $P_1$ and $P_2$, essentially the same sum frequency generated power is produced as when $P_1+P_2=1$ W. That is, 941 mW in the case where $P_1$ is 1 W and $P_2$ is 1 mW are wasted based on the conversion efficiency shown by Eq. 2.

It can be shown from simple calculus that when $P_1+P_2$ is constant, the product $P_1P_2$ is maximized when $P_1=P_2$. Therefore, the sum frequency generated power produced at 459 nm will be maximized when the intracavity power which, as indicated previously, depends upon the pump power from the argon ion pump laser, is equally distributed between the two fundamental wavelengths, 808 nm and 1.064 μ in this exemplary case.

The value of h can be determined, see for example G. D. Boyd and D. A. Kleinman, *J. Appl. Phys.*, vol. 39, p. 3597, 1968, and is a function of the ratio of the KTP length to the confocal parameter b. The confocal parameter b is $2\pi w_o^2 n_2/\lambda$, where $w_o^2$ is the $1/e^2$ spot radius $n_2$ is the refractive index of KTP at 808 nm along the Z axis (1.84), and λ is the wavelength. Assuming no double refraction, h is 0.56 and the optimum $P_3$ is 738 mW at 459 nm.

Figure 9:
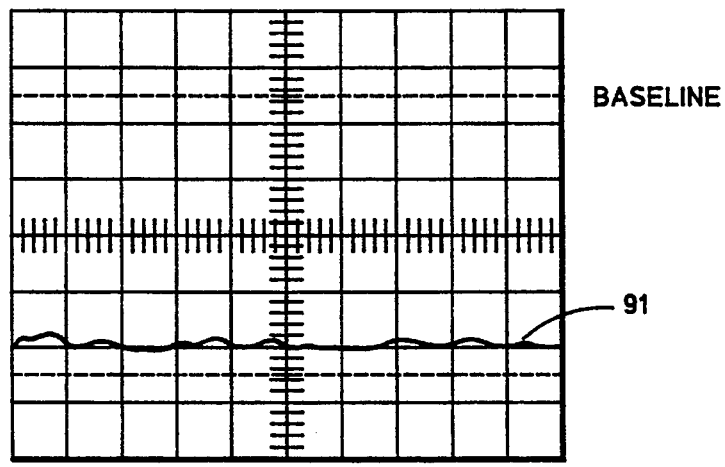
FIG. 9 illustrates a typical oscilloscope trace of the temporal dependence of the output power at 459 nm.

The short term temporal stability of the 459 nm output was determined using a fast photodiode and oscilloscope. A typical output trace 91 at full power is shown in FIG. 9, where the temporal scale (horizontal axis) is 5 ms per division. The maximum amplitude fluctuations were ±5% with peaks occurring on a ms time scale. Faster temporal amplitude fluctuations were not observed. Long term stability was excellent, and output power levels were maintained for several hours.

Figure 10:
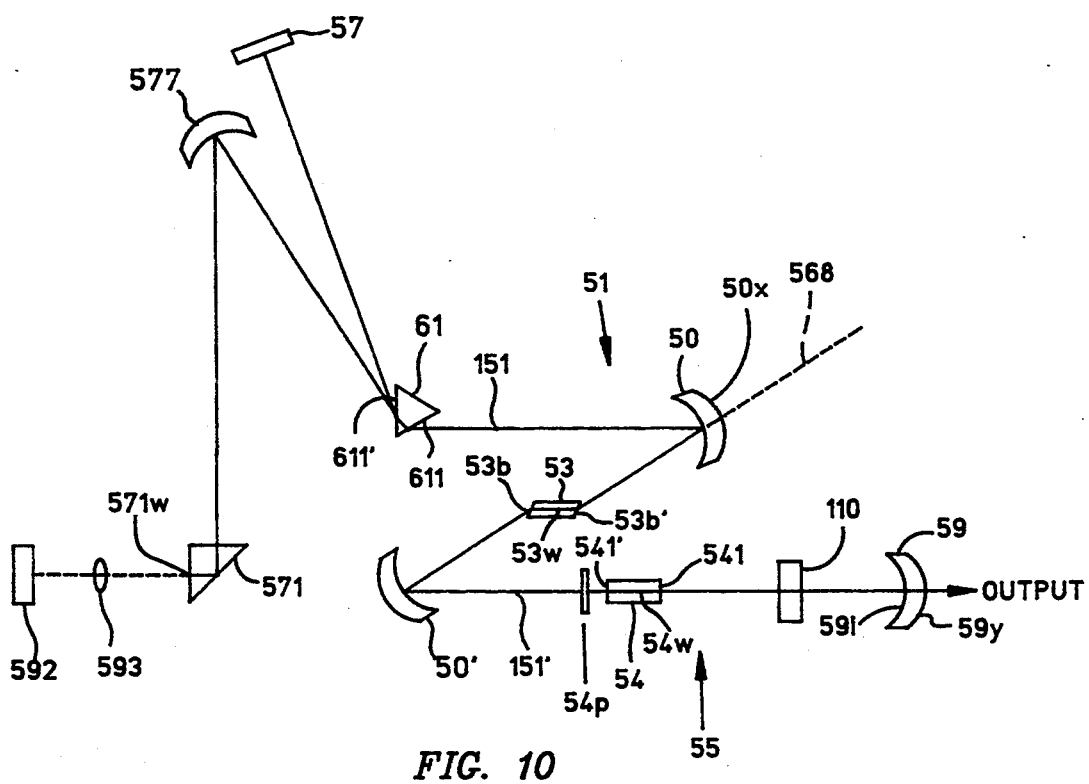
FIG. 10 illustrates a fifth embodiment of the invention.
Figure 11A:
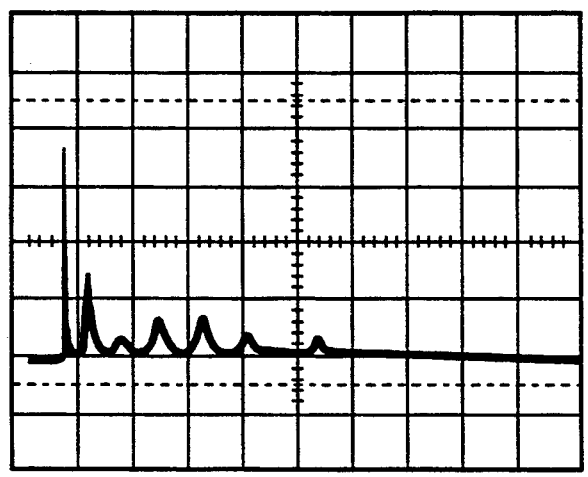
FIG. 11A illustrates the temporal dependence of the 1.064 $\mu$ output from the dual wavelength laser illustrated in FIG. 10.
Figure 11B:
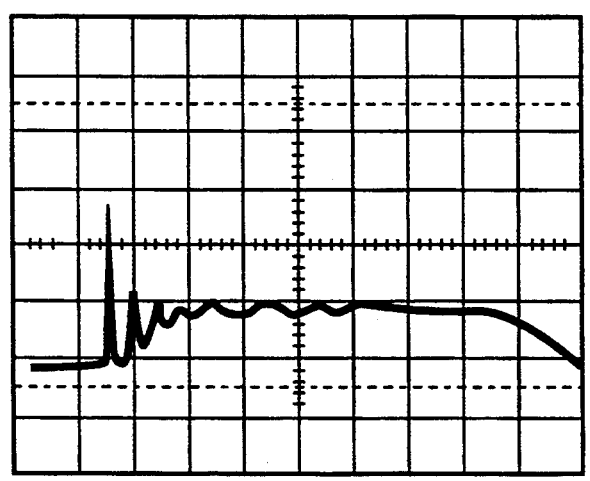
FIG. 11B illustrates the temporal dependence of the 808 nm output from the dual wavelength laser illustrated in FIG. 10.

Repetitively Q-switched operation led to a substantial improvement in the conversion efficiency. Referring now to the embodiment of this inventive concept illustrated in FIG. 10, a mechanical chopper 110 was inserted in the region of the resonator containing KTP crystal 54. This allowed simultaneous Q-switching of both 808 nm and 1.064 μ wavelengths since they are overlapped and spatially collinear in this region. The argon ion pump power along path 568 and laser diode pump 592 were continuously on, and the switching rate of chopper 110 was 2.9 kHz. The Q-switched pulse at 808 nm consisted of an initial amplitude spike followed by damped ringing oscillations. As the ringing pulse amplitude diminished, steady state operation was established for the duration of the time the shutter was open. The temporal shape of the 1.064 μ output was similar, consisting of an initial Q-switched spike followed by several smaller peaks and eventual steady state operation. A typical waveform is shown in FIG. 11A for 1.064 μ and in FIG. 11B for 808 nm. The time scale for both figures is 5.4 μs per division. Both the trace shown in FIG. 11A and that shown in FIG. 11B are synchronous in time, having been triggered by the chopper trigger pulse.

Owing to the short lifetime of $Ti^{3+}$ in sapphire, the ratio of the peak intensity to steady state output at 808 nm was substantially lower than was obtained at 1.064 μ. The dynamics of the 1.064 μ Q-switched pulse are dominated by active mirror 571, as the gain in the Nd:YAG comprising the substrate of active mirror 571, having a waist 571w, is substantially higher at the time the shutter opens than it is at 1.064 μ in Ti:sapphire laser crystal 53. The gain in the Nd:YAG is also higher than the Ti:sapphire gain at 808 nm. As a consequence the 1.064 μ pulse build up time is shorter and the 1.064 μ pulse precedes the 808 nm pulse by about 5 μs.

When the laser is Q-switched as described above, the 459 nm output consists of several sharp spikes corresponding to times where the 808 nm and 1.064 μ ringing pulses temporally overlap. The initial Q-switched pulses do not temporally overlap and therefore do not generate blue output. To compensate for this temporal mismatch between the initial Q-switched pulses, the pump power from laser diode 592 was decreased to approximately 300 mW. At the lower gain the initial temporal amplitude spikes at both wavelengths overlapped well and generated over 1.8 W of peak power at 459 nm. The pulse width was approximately 100 ns.

Under cw operation with 300 mW of diode pump power from laser diode 592, only 10.9 mW of average power was produced at 459 nm. The peak power enhancement factor for 459 nm Q-switched operation, which is the ratio of peak power to cw power, is 167. The peak conversion efficiency for pulsed operation based on the cw pump power is 34%. For cw generation with 7 W of total pump power (5 W from the ion laser and 2 W from the diode) the efficiency is 1.6%. A better measure of the cw sum frequency generation efficiency may be obtained by the ratio of the 459 nm output to the best cw 808 nm and 1.064 μ power generated by the resonator. On this basis the conversion efficiency is 16%.

Figure 12:
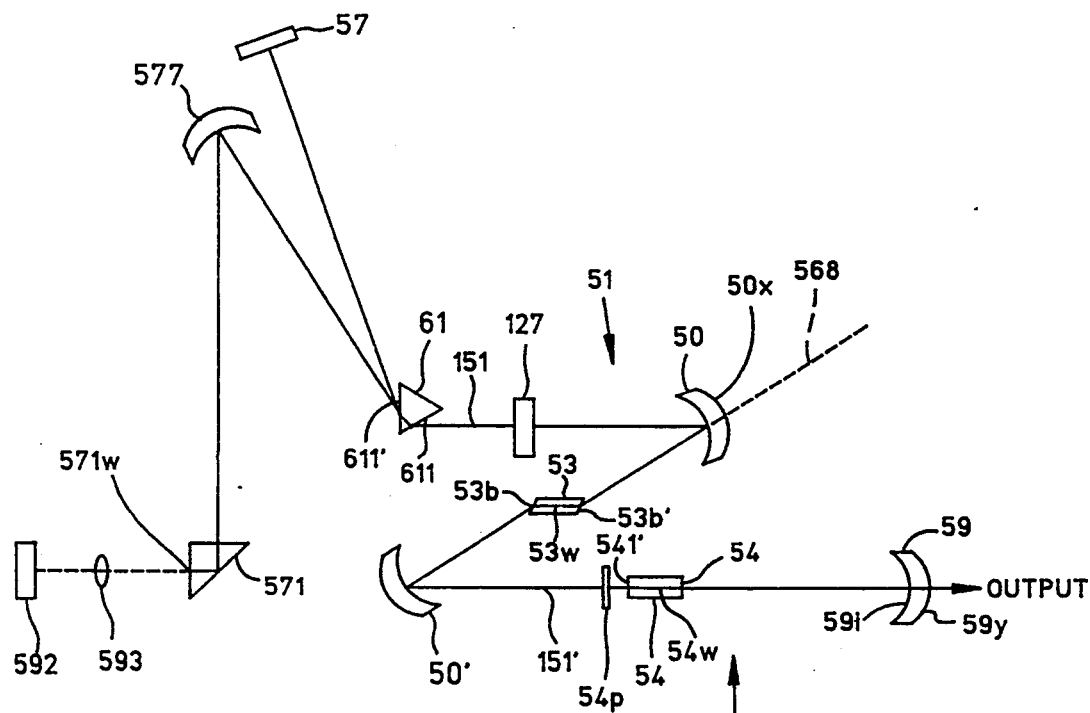
FIG. 12 illustrates a sixth embodiment of the invention.
Figure 13:
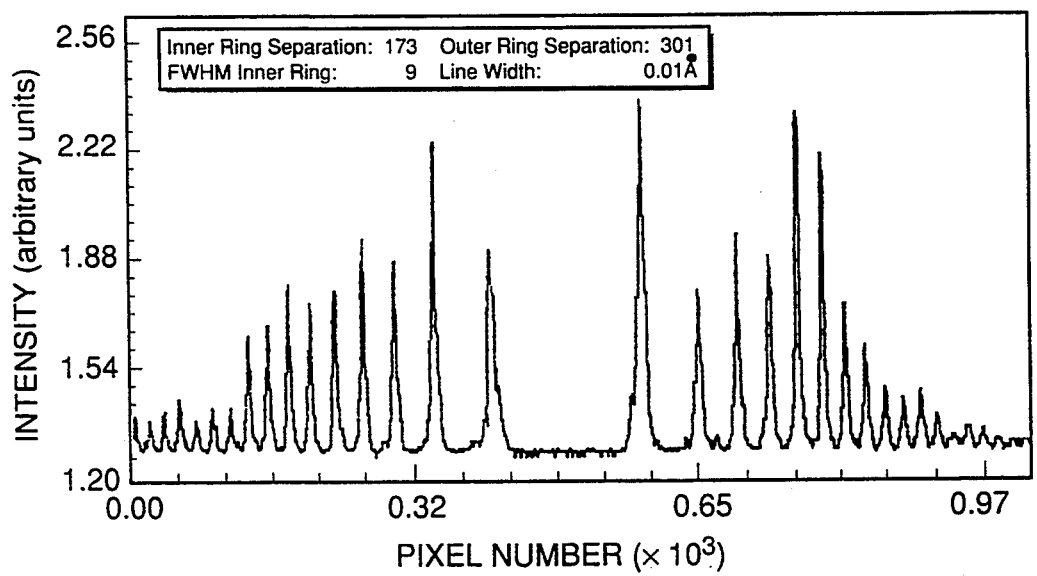
FIG. 13 illustrates a typical Fabry-Perot interferogram demonstrating the narrow linewidth at 459 nm using the embodiment of the invention illustrated in FIG. 12.

The linewidth was measured for both fundamental wavelengths and the generated blue output. With no intracavity etalons, the linewidth at 808 nm was 0.03 nm, while at 1.064 μ the width was 0.17 nm. The larger width at the longer wavelength is due in part to the lower prism dispersion at 1.064 μ relative to 808 nm and the large gain bandwidth for Nd:YAG. The width of the 459 nm output was 0.06 nm. Referring to the embodiment of this inventive concept illustrated in FIG. 12, a single 0.5 mm thick etalon plate 127 was inserted in the collimated region of the resonator in a position where both wavelengths could be simultaneously narrowed. In this configuration, the linewidth measurement at 459 nm was resolution-limited to 1 pm. An illustration of a Fabry-Perot interferometric measurement of the output at 459 nm is shown in FIG. 13. Some tunability of the blue wavelength was obtained by tuning the short wavelength (808 nm) fundamental. Wavelength tuning is achieved by rotating the HR end mirror 57. Sum frequency generated wavelengths from 457.16 to 460.13 nm were obtained, giving a tuning range of about 3 nm.

The discrepancy between the optimum power given by Eq. 2 and the best power obtained is primarily a result of the inhomogeneities of the exemplary KTP crystal used. Only 15% of the calculated 459 nm power was obtained. With a higher crystal quality, significantly higher 459 nm generated power should be realized. It is interesting to determine the effect of the mismatch in mode waists for the two fundamental wavelengths on the SFG power. The mode waist for each wavelength is proportional to $\lambda^{\frac{1}{2}}$, and for a circular Gaussian beam the area $A = \pi w_o^2 / 2$ where w is the mode waist.

Eq. 2 is valid only if the beam areas for the mixing waves are equal. This equation can be re-written, see for example W. P. Risk and W. Lenth, *Appl. Phys. Lett.*, vol. 54, p. 789, 1989, to include the beam area explicitly in the expression for $P_3$:

$$P_3 = \xi \frac{P_1 P_2}{A_1 + A_2} \quad (3)$$

where $\xi$ is a constant independent of the beam dimensions and $A_1$ and $A_2$ are the areas of the 808 nm and 1.064 $\mu$ modes, respectively. If the beam areas are equal, $A_1 + A_2 = 2A_1$. In the exemplary dual wavelength resonator, $A_2 = (1064/808)A_1 = 1.32 A_1$ so that $P_3$ is reduced by a factor of 0.86 as a result of the larger area of the 1.064 $\mu$ wave. This reduction of course is relative to the case where both beam radii are given by the dimensions of the 808 nm waist. Note that both the confocal parameter b and the focusing parameter h are independent of the wavelength in the coupled cavity resonator.

Optimum focusing produces an increase in the SFG power. For this case $h = 1.068$ and Eq. 2 becomes $$P_3 = 3.58 l_c P_1 P_2. \quad (4)$$

For the same crystal length and intracavity power, optimum focusing will increase the 459 nm power by a factor of 1.9 relative to the power calculated using Eq. 2 with $h = 0.56$. However, for the optimum focus $l_c/b = 2.84$, and for the exemplary 5 mm long KTP crystal this requires a beam waist in the KTP of approximately 11$\mu$. The mirror separation required to produce so small a waist forces the resonator to operate close to the stability limit. This increases the sensitivity of the resonator to small changes in cavity length due to thermal effects and vibrations. Alternatively, optimum focusing could be obtained with a larger waist by using a longer KTP crystal length. However the exemplary 25 $\mu$ waist used would require $l_c$ to be approximately 25 mm.

A laser in accordance with this inventive concept has a wide range of applications, including various medical, sensing, pollution monitoring, laser ranging, aircraft wind speed and wind shear measurement applications, surveillance and communications.

It should therefore be readily be understood that many modifications and variations of the present invention are possible within the purview of the claimed invention. It is therefore to be understood that within the scope of the appended claims the invention may be practiced otherwise than as specifically described.

I claim:

1. A laser generating two wavelengths simultaneously within a preselected range of wavelengths for producing a third wavelength by sum frequency generation comprising:

a laser resonator for said two wavelengths generated simultaneously within said preselected range of wavelengths defining a laser resonator cavity by two end reflective elements, three highly reflective concave fold mirror elements and an output coupler reflective element arranged to form a reflective path for a laser resonator mode in said laser resonator cavity, at least one of said two end reflective elements being an active mirror, said active mirror being disposed to receive an optical pumping wavelength and having a substrate which provides optical gain at one of said two wavelengths when optically pumped with said optical pumping wavelength, said active mirror being coated on its exterior face to provide high reflectivity for said one of said two wavelengths and to provide high transmission for said optical pumping wavelength, and said active mirror being coated on its interior face to provide low reflectivity at said one of said two wavelengths;

a dispersing prism disposed in said laser resonator cavity between one of said concave fold mirror elements and said two end reflective elements to spatially disperse said two wavelengths, said dispersing prism and said two end reflective elements being aligned in a manner such that each of said two end reflective elements defines a discrete end region of a separate one of two feedback paths in said laser resonator cavity, each of said two feedback paths being for a discrete one of said two wavelengths in said preselected range of wavelengths;

a laser gain element disposed in said laser resonator cavity to produce laser emission including said two wavelengths in said preselected range of wavelengths;

means for optically exciting said laser gain element in an end pumping mode to produce said laser emission that includes said two wavelengths in said preselected range of wavelengths; and a non-linear optical crystal located within said laser resonator cavity having the property to generate said third wavelength being the sum frequency of said two wavelengths.

2. The laser of claim 1 in which said active mirror is optically pumped in an end pumping mode, and one of said three fold mirror elements is located within said laser resonator cavity to produce a laser resonator cavity mode waist at said exterior face of said active mirror.

3. The laser of claim 2 in which the laser gain element is a solid state gain element.

4. The laser of claim 3 in which said solid state gain element is a Ti:sapphire gain element, and said substrate of said active mirror is Nd:YAG.

5. The laser of claim 4 in which said first wavelength of said two wavelengths is approximately 808 nm and said second wavelength of said two wavelengths is 1.064 $\mu$, said non-linear optical crystal for generating said sum frequency is a Type II KTP crystal non-critically phase matched for sum frequency generation at approximately 25° C. and said sum frequency of said third wavelength is approximately 459 nm.

6. The laser of claim 3 in which said solid state gain element is a crystalline material that includes a host material doped with activator ions to produce said laser emission in said preselected range of wavelengths when said crystal line material is optically excited by end pumping thereof.

7. The laser of claim 6 in which said host material is a sapphire host material and said activator ions in said sapphire host material include a dopant of $Ti^{3+}$ ions to enable said crystalline material to produce said laser emission within said preselected range of wavelengths from about 680 nm to 1.1 $\mu$ when said solid state gain element is optically excited by said optically exciting means.

8. The laser of claim 2 in which said laser gain element is a liquid gain element.

9. The laser of claim 8 in which said liquid gain element is a dye solution gain element.

10. The laser of claim 2 in which said laser gain element is a gaseous gain element.

11. The laser of claim 2 in which said laser gain element is a semiconductor gain element.

12. The laser of claim 2 in which said active mirror is optically pumped by a laser diode.

13. The laser of claim 12 in which the output of said laser diode used in said end pumping mode is focused onto said exterior face of said active mirror so that the pump focus size is approximately the same as said laser resonator cavity mode waist at said exterior face, and the divergence of the focused output of said laser diode within said active mirror is approximately the same as the divergence of said laser resonator cavity mode within said active mirror.

14. The laser of claim 2 in which said one of said two end reflective elements is a partial reflector which transmits one of said two wavelengths, and the other of said two end reflective elements is said active mirror, and said one of said two wavelengths is transmitted through said partial reflector and directed to said exterior face of said active mirror to optically pump said active mirror.

15. The laser of claim 2 in which said non-linear optical crystal is a KTP crystal.

16. The laser of claim 2 in which each of said two wavelengths is linearly polarized and the orientation of the polarization of each of said two wavelengths is parallel within said laser gain element.

17. The laser of claim 2 in which said non-linear optical crystal is configured for Type II sum frequency generation, and further including:
means disposed in said laser cavity for rotating the polarization of one wavelength of said two wavelengths 90° with respect to the other wavelength of said two wavelengths, the rotating means is disposed to effect the polarization rotation within said non-linear optical crystal but not in said laser gain element.

18. The laser of claim 17 in which said polarization rotating means is a multiple order wave plate.

19. The laser of claim 2 in which said output coupler is a concave output coupler disposed relative to one of said three concave fold mirror elements to produce a nearly concentric laser cavity mode therebetween and to produce a laser resonator cavity mode waist in said non-linear optical crystal.

20. The laser of claim 2 in which said non-linear optical crystal is non-critically phase matched for sum frequency generation.

21. The laser of claim 2 in which one region of said laser resonator cavity contains both of said two wavelengths arranged in a spatially collinear and spatially overlapped relationship.

22. The laser of claim 21 in which said one region in which said both of said two wavelengths are spatially collinear and spatially overlapped contains said non-linear optical crystal for generating said third wavelength by sum frequency generation, said two wavelengths thereby being spatially superimposed within said non-linear optical crystal.

23. The laser of claim 22 in which another region of said laser resonator cavity contains both of said two wavelengths where each of said two wavelengths are spatially separated and distinct.

24. The laser of claim 23 in which said laser operates simultaneously at a first wavelength and at a second wavelength of said two wavelengths, the net gain in said laser gain element for said first wavelength being substantially higher than the net gain in said laser gain element for said second wavelength, and said active mirror located in a feedback path of said another region provides optical amplification for spatially separated and distinct second wavelength.

25. The laser of claim 24 in which said active mirror provides optical gain for said second wavelength as said laser resonator mode passes through said active mirror substrate, said active mirror being coated on its said exterior face to reflect the amplified said second wavelength back into said laser resonator cavity.

26. The laser of claim 2 in which the geometry of said active mirror is that of a plane parallel plate.

27. The laser of claim 2 in which the geometry of said active mirror approximates that of a right angle isosceles prism.

28. The laser of claim 2 further including:
means disposed in said laser cavity for narrowing the linewidth of at least one of said two wavelengths operating simultaneously in said laser.

29. The laser of claim 28 in which said means for narrowing includes two etalon plates of different thicknesses disposed in said laser resonator cavity.

30. The laser of claim 2 further including:
a single etalon plate disposed in said laser resonator cavity for simultaneously narrowing the linewidth of both of said two wavelengths to produce a line narrowed said third wavelength.

31. The laser of claim 2 in which said laser is continuously tunable over said preselected range of wavelengths and at least one of said two reflective end elements is rotatable to provide a tunable said sum frequency said third wavelength.

32. The laser of claim 2 in which said laser gain element is a solid state gain element with Brewster cut end faces to provide a polarized laser mode for both of said two wavelengths within said laser resonator cavity.

33. The laser of claim 2 in which said two wavelengths operate simultaneously in the lowest order transverse spatial mode over said preselected range of wavelengths.

34. The laser of claim 2 in which said two wavelengths are produced cw.

35. The laser of claim 2 further including a means disposed within said laser resonator cavity for periodically interrupting said generation of said two wavelengths to produce a repetitively Q-switched output of said third wavelength being the sum frequency of said two wavelengths.

36. The laser of claim 2 in which said substrate of said active mirror is approximately 1.1% $Nd^{3+}$ in YAG, said substrate of said active mirror is optically pumped at approximately 808 nm to provide optical amplification at 1.064 $\mu$ within said laser resonator cavity.

37. The laser of claim 2 in which said one of said three fold mirrors is disposed and oriented to locate said laser resonator cavity mode waist at said exterior face of said active mirror and is used at a low angle of incidence with respect to said laser resonator cavity mode.

38. The laser of claim 2 in which said laser is continuously tunable to produce cw simultaneous laser emission at any two wavelengths within said preselected range of wavelengths.

39. The laser of claim 38 in which said sum frequency said third wavelength is continuously tunable over a preselected range of wavelengths.

40. The laser of claim 2 in which said dispersing prism is oriented in a minimum deviation configuration and has two optical faces oriented at Brewster's angle with respect to the laser resonator cavity mode, and said dispersing prism being rotatable to determine said two wavelengths which are simultaneously generated within said preselected range of wavelengths, and oriented to provide substantial dispersion for said two wavelengths to produce spatially separate and spatially distinct feedback paths for each of said two wavelengths in a region of said laser resonator cavity.

41. The laser of claim 40 in which said dispersing prism is highly dispersive and is composed of a Faraday rotator glass.

42. The laser of claim 41 in which said dispersing prism is composed of SF 55 glass.

43. The laser of claim 1 in which said means for optically exciting said laser gain element is an argon ion laser.

44. The laser of claim 1 in which said means for optically exciting said laser gain element is a doubled Nd:YAG laser.

* * * * *